US009429419B2

(12) United States Patent
Piatt

(10) Patent No.: US 9,429,419 B2
(45) Date of Patent: *Aug. 30, 2016

(54) MEDIA-TRACKING SYSTEM USING DEFORMED REFERENCE MARKS

(71) Applicant: Eastman Kodak Company, Rochester, NY (US)

(72) Inventor: Michael Joseph Piatt, Dayton, OH (US)

(73) Assignee: EASTMAN KODAK COMPANY, Rochester, NY (US)

( * ) Notice: Subject to any disclaimer, the term of this patent is extended or adjusted under 35 U.S.C. 154(b) by 307 days.

This patent is subject to a terminal disclaimer.

(21) Appl. No.: 13/941,804

(22) Filed: Jul. 15, 2013

(65) Prior Publication Data

US 2015/0015635 A1    Jan. 15, 2015

(51) Int. Cl.
| | |
|---|---|
| B41J 29/38 | (2006.01) |
| G01B 11/14 | (2006.01) |
| B65H 43/00 | (2006.01) |
| G01P 3/36 | (2006.01) |
| G01D 5/347 | (2006.01) |
| B41J 11/46 | (2006.01) |

(52) U.S. Cl.
CPC ............... *G01B 11/14* (2013.01); *B41J 11/46* (2013.01); *B65H 43/00* (2013.01); *G01D 5/347* (2013.01); *G01P 3/36* (2013.01); *B65H 2557/62* (2013.01)

(58) Field of Classification Search
CPC .............. B41J 13/0009–13/0027; B41J 29/42
USPC ............................. 101/485; 347/16, 101, 104
See application file for complete search history.

(56) References Cited

U.S. PATENT DOCUMENTS

| | | | |
|---|---|---|---|
| 3,701,464 A | 10/1972 | Crum | |
| 3,803,628 A | 4/1974 | Van Brimer et al. | |
| 3,913,719 A | 10/1975 | Frey | |
| 4,721,969 A | 1/1988 | Asano | |
| 4,887,530 A | 12/1989 | Sainio | |
| 4,963,899 A | 10/1990 | Resch, III | |
| 5,093,674 A | 3/1992 | Storlie | |
| 5,360,152 A | 11/1994 | Matoushek | |
| 5,505,129 A | 4/1996 | Greb et al. | |
| 5,682,331 A | 10/1997 | Berlin | |
| 5,691,921 A | 11/1997 | Berlin | |
| 6,068,362 A | 5/2000 | Dunand et al. | |
| 6,270,866 B1 * | 8/2001 | Okuda et al. | 428/35.1 |
| 6,362,847 B1 | 3/2002 | Pawley et al. | |

(Continued)

FOREIGN PATENT DOCUMENTS

| | | |
|---|---|---|
| DE | 296 10 216 | 8/1996 |
| EP | 0123305 | 10/1984 |

(Continued)

*Primary Examiner* — Calvin C Ma
(74) *Attorney, Agent, or Firm* — Kevin E. Spaulding

(57) ABSTRACT

A system is described for tracking a position of a receiver medium as it travels along a media path. A heat source provides heat to the receiver medium in a localized area sufficient to permanently deform the receiver medium to form a reference mark. A light source illuminates the receiver medium, and a sensor is used to sense light from the light source that is transmitted through the receiver medium or reflected from the receiver medium thereby providing a sensed light level signal. The sensed light level signal is analyzed to determine a position of the receiver medium by detecting a change in the sensed light level signal that is characteristic of the physical deformation associated with the reference mark.

23 Claims, 17 Drawing Sheets

(56) References Cited

U.S. PATENT DOCUMENTS

| | | |
|---|---|---|
| 6,682,163 B2 | 1/2004 | Metzler et al. |
| 6,927,875 B2 | 8/2005 | Ueno et al. |
| 8,123,326 B2 | 2/2012 | Saettel et al. |
| 8,169,601 B2* | 5/2012 | Maruo et al. .................. 356/51 |
| 8,931,874 B1* | 1/2015 | Piatt ........................ B41J 11/46 347/104 |
| 2006/0086275 A1* | 4/2006 | Fermandez et al. .......... 101/485 |
| 2006/0127144 A1* | 6/2006 | Watanabe ..................... 399/329 |
| 2007/0172270 A1 | 7/2007 | Jorgens et al. |
| 2009/0028423 A1* | 1/2009 | Sandstrom et al. ........... 382/149 |
| 2011/0102851 A1 | 5/2011 | Baeumler |
| 2011/0128337 A1 | 6/2011 | Muir et al. |
| 2011/0129278 A1 | 6/2011 | Muir et al. |

FOREIGN PATENT DOCUMENTS

| | | |
|---|---|---|
| EP | 0729846 | 3/1995 |
| GB | 2271744 | 4/1994 |
| JP | H01 122465 | 5/1989 |
| JP | 2012 171222 | 9/2012 |

* cited by examiner

MEDIA-TRACKING SYSTEM USING DEFORMED REFERENCE MARKS

CROSS-REFERENCE TO RELATED APPLICATIONS

Reference is made to commonly assigned, U.S. patent application Ser. No. 13/484,369 now U.S. Pat. No. 8,733,833, entitled: "Detecting stretch or shrink in print media", by Rzadca et al.; to commonly assigned, U.S. patent application Ser. No. 13/484,378 now U.S. Pat. No. 8,733,884, entitled: "Detecting stretch or shrink in print media", by Rzadca et al.; to commonly assigned, U.S. patent application Ser. No. 13/941,713 now U.S. Pat. No. 8,931,874, entitled: "Media-tracking system using marking heat source", by Piatt et al.; to commonly assigned, U.S. patent application Ser. No. 13/941,733 now U.S. Pat. No. 8,960,842, entitled: "Media-tracking system using thermal fluorescence quenching", by Piatt et al.; and to commonly assigned, U.S. patent application Ser. No. 13/941,768 now U.S. Pat. No. 9,056,736, entitled: "Media-tracking system using thermally-formed holes", by Piatt et al., each of which is incorporated herein by reference.

FIELD OF THE INVENTION

This invention generally relates to a digital printing system, and more particularly to tracking the position of a receiver medium along a media path through the digital printing system.

BACKGROUND OF THE INVENTION

Continuous web printing allows economical, high-speed, high-volume print reproduction. In this type of printing, a continuous web of paper or other print media material is fed past one or more printing subsystems that form images by applying one or more colorants onto the print media surface. With this type of printing system, finely controlled dots of ink are rapidly and accurately propelled from the printhead onto the surface of a moving print media, with the web of print media often coursing past the printhead at speeds measured in hundreds of feet per minute. During printing, variable amounts of ink may be applied to different portions of the rapidly moving print media web, with drying mechanisms typically employed after each printhead or bank of printheads. Variability in ink or other liquid amounts and types or variability in drying times can cause print media stiffness and tension characteristics to vary dynamically for different types of print media, contributing to the overall complexity of print media handling and print media dot registration.

U.S. Pat. No. 3,803,628, to VAN et al., entitled "Apparatus and method for positionally controlled document making," discloses using a row of optical sensors to detect the location of the edge of the paper. The output of the sensor is used to control the placement of the printed image in the cross-track direction.

U.S. Pat. No. 3,913,719, to Frey et al., entitled "Alternate memory control for dot matrix late news device," discloses the printing of cue marks on the paper by a rotary printing press. The start location for an inkjet printed image is measured out by counting encoder pulses following the detection of the cue marks.

U.S. Pat. No. 4,721,969 to Asano, entitled "Process of correcting for color misregistering in electrostatic color recording apparatus," discloses printing of registration marks along each edge of the paper. The detected positions of these marks are used to adjust the placement of the subsequently printed image planes to account for offsets in the tracking of the paper and to account for elongation or shrinkage of the paper in the cross-track direction, and to account for skew of the paper as well.

Commonly-assigned U.S. Pat. No. 4,963,899, to Resch, entitled "Method and apparatus for image frame registration," discloses an electrophotographic printer in which the in-track position of the web is monitored by detection of light passing through perforation in the web.

U.S. Pat. No. 5,093,674 to Storlie, entitled "Method and system for compensating for paper shrinkage and misalignment in electrophotographic color printing," discloses a method for adjusting an image size for a channel of an electrophotographic printer by altering a scanning mirror speed.

U.S. Pat. No. 5,505,129 to Greb et al., entitled "Web width tracking," discloses a method for tracking the width of a printed medium by detecting the edges of the medium.

U.S. Pat. No. 5,682,331 to Berlin et al., entitled "Motion tracking using applied thermal gradients," and related U.S. Pat. No. 5,691,921 to Berlin et al., entitled "Thermal sensors arrays useful for motion tracking by thermal gradient detection," provide a system using invisible thermal marks for tracking the motion of print media. A localized hot spot on the print media is formed by a thermal marking unit, and thermal sensor arrays downstream of the thermal marking unit in the system are used to detect the local hot spot. This approach is generally not compatible with printing systems in which dryers are located between thermal marking unit and the thermal sensor arrays because the heat provided by the dryers raises the background temperature, reducing the contrast of the thermal marks relative to the background. Furthermore, any non-uniformity in the heat profile provided by the dryer or air flow over the print media can produce non-uniform surface temperatures making it more difficult to detect the applied localized hot spot.

U.S. Pat. No. 6,068,362, to Dunand et al., entitled "Continuous multicolor ink jet press and synchronization process for this press," discloses periodic printing of reference marks by a mark printer. Sensors upstream of subsequent printheads detect the reference marks. An encoder attached to the drive motor monitors paper motion. Variations in the detected spacings of the marks provides an indication of paper shrink or stretch. A pulse train is created in which the time between pulses is modified relative to the encoder pulse rate to account for the paper shrink and stretch. In some embodiments, the marks can fluorescent color marks printed on front or back side of the paper.

U.S. Pat. No. 6,362,847 to Pawley et al., entitled "Electronic control arrangement for a laser printer," discloses a method for adjusting a length of a printed line by inserting or removing clock timing pulses.

U.S. Pat. No. 6,927,875 to Ueno et al., entitled "Printing system and printing method," teaches a method for correcting for heat shrinkage by controlling a timing of light emission. The shrinkage is characterized by detecting media edges.

Commonly-assigned U.S. Pat. No. 8,123,326, Saettel et al., entitled "Calibration system for multi-printhead ink systems," discloses a color-to-color registration system for a printer. Each of the printheads periodically prints registrations mark, and the registration marks are subsequently detected. Based on the detected relative position of the registration marks from the different color planes, corrections are made to bring the color planes into registration.

In-track registration adjustments are made by frequency shifting the encoder pulse stream to account for shrink or stretch of the paper in the in-track direction. Because the registration corrections for a particular image plane are based on measured registration errors for one or more previously printed image planes, the corrections always lag behind the printing.

U.S. Patent Application Publication 2007/0172270 to Joergens et al., entitled "Method and device for correcting paper shrinkage during generation of a bitmap," discloses a method for compensating for paper shrinkage by adding or removing image pixels, preferably in un-inked locations.

U.S. Patent Application Publication 2011/0102851 to Baeumler, entitled "Method, device and computer program to correct a registration error in a printing process that is due to deformation of the recording medium," discloses a method for deforming an image to correct for registration errors, wherein the pixels to be deformed are selected stochastically.

European patent document EP0729846, to Piatt et al., entitled "Printed reference image compensation," discloses the periodic printing of reference marks by an initial printhead. The reference marks are detected upstream of the printhead that overlays an image over the image printed by the first printhead. The reference marks are a collection of evenly spaced lines. The detected spacing of these lines at a downstream location, is used to identify paper stretch and shrink in the in-track direction. Data rates are adjusted to account for the detected paper shrink and stretch.

There remains a need for an improved system to track a position of a receiver medium as it travels along a media path.

SUMMARY OF THE INVENTION

The present invention represents a system for tracking a position of a receiver medium as it travels along a media path, comprising:

a heat source located at a first position along the media path adapted to provide heat to the receiver medium in a localized area, the receiver medium being formed from a thermally deformable material, the provided heat being sufficient to permanently deform the receiver medium to form a reference mark characterized by a physical deformation of the receiver medium;

a light source that illuminates the receiver medium when it has traveled to a second position along the media path;

a sensor adapted to sense light from the light source that is transmitted through the receiver medium or reflected from the receiver medium thereby providing a sensed light level signal; and a data processor adapted to analyze the sensed light level signal to determine a position of the receiver medium as the receiver medium passes through the second position along the media path by detecting a change in the sensed light level signal that is characteristic of the physical deformation associated with the reference mark.

This invention has the advantage that reference marks can be conveniently and inconspicuously formed on the receiver medium to enable the position of the receiver medium to be accurately detected at downstream positions along the media path.

It has the additional advantage that the detected positions of the reference marks can be used to characterize any distortions of the reference media during the printing process and determine appropriate corrections that can be applied to properly align the image data printed by downstream printheads.

It has the further advantage that the reference marks can be formed on a wide variety of receiver media, including transparent receiver media fabricated using a thermoplastic material.

BRIEF DESCRIPTION OF THE DRAWINGS

In the detailed description of the example embodiments of the invention presented below, reference is made to the accompanying drawings, in which.

Figure 1:
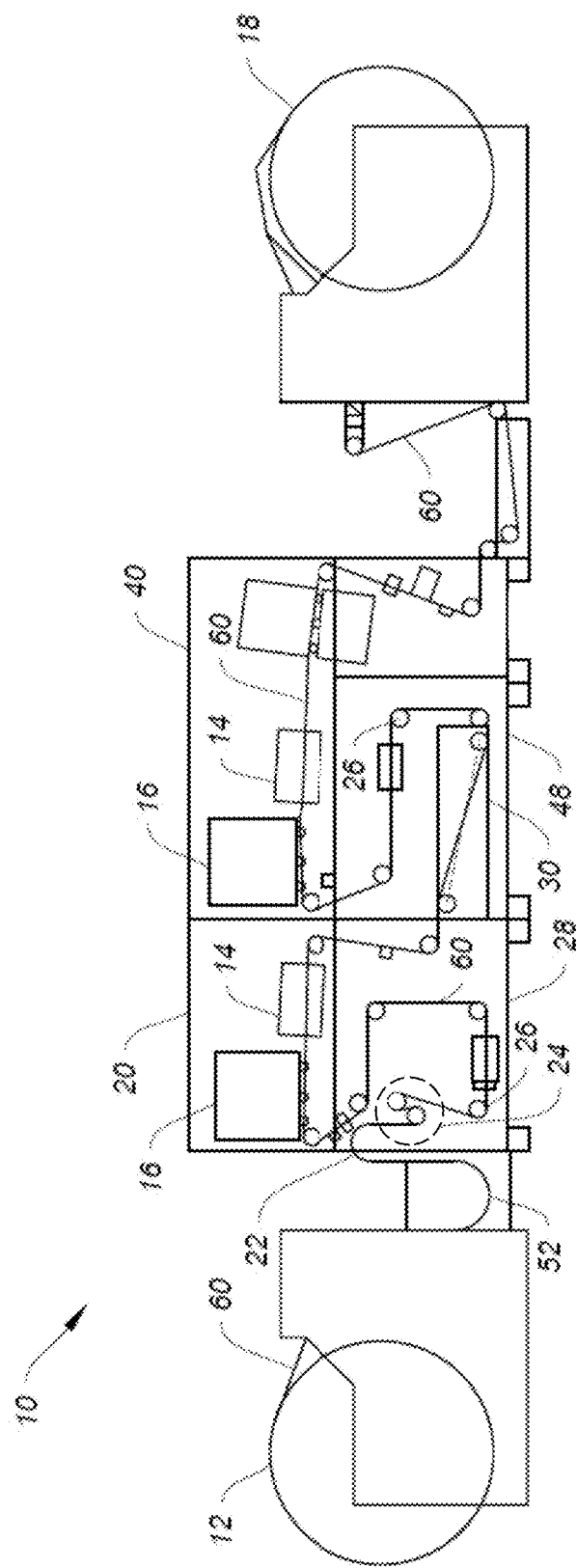
FIG. 1 is a schematic side view of a digital printing system according to an example embodiment of the present invention.

It is to be understood that the attached drawings are for purposes of illustrating the concepts of the invention and may not be to scale.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The present invention is well-suited for use in roll-fed inkjet printing systems that apply colorant (e.g., ink) to a web of continuously moving print media. In such systems a printhead selectively moistens at least some portion of the media as it moves through the printing system, but without the need to make contact with the print media. While the present invention will be described within the context of a roll-fed inkjet printing system, it will be obvious to one skilled in the art that it could also be used for other types of printing systems as well.

In the context of the present invention, the terms "web media" or "continuous web of receiver media" are interchangeable and relate to a receiver medium (e.g., a print medium) that is in the form of a continuous strip of media as it passes through the web media transport system from an entrance to an exit thereof. The continuous web media serves as the receiving medium to which one or more colorants (e.g., inks or toners), or other coating liquids are applied. This is distinguished from various types of "continuous webs" or "belts" that are actually transport system components (as compared to the print receiving media) which are typically used to transport a cut sheet medium in an electrophotographic or other printing system. The terms "upstream" and "downstream" are terms of art referring to relative positions along the transport path of a moving web; points on the web move from upstream to downstream.

Additionally, as described herein, the example embodiments of the present invention provide a printing system or printing system components typically used in inkjet printing systems. However, many other applications are emerging which use inkjet printheads to emit liquids (other than inks) that need to be finely metered and deposited with high spatial precision. As such, as described herein, the terms "liquid," "ink," "print," and "printing" refer to any material that can be ejected by the liquid ejector, the liquid ejection system, or the liquid ejection system components described below.

Referring to the schematic side view of FIG. 1, there is shown a digital printing system 10 for continuous web printing according to one example embodiment of the invention. A first module 20 and a second module 40 are provided for guiding continuous web of receiver medium 60 that originates from a source roller 12. Following an initial slack loop 52, the receiver medium 60 that is fed from source roller 12 is then directed through digital printing system 10, past one or more printheads 16 and supporting components of the digital printing system 10. Module 20 has a support structure 28 that includes a cross-track positioning mechanism 22 for positioning the continuously moving receiver medium 60 in the cross-track direction, that is, orthogonal to the direction of travel and in the plane of travel. In one embodiment, the cross-track positioning mechanism 22 is an edge guide for registering an edge of the moving receiver medium 60. A tensioning mechanism 24, affixed to the support structure 28 of module 20, includes structure that pretensions the receiver medium 60. In accordance with the present invention, the tensioning mechanism 24 is automatically adjusting to provide a substantially constant amount of tension of the receiver medium 60 independent of the characteristics of the receiver medium 60.

The second module 40, positioned downstream from the first module 20 along the path of the receiver medium 60, also has a support structure 48, similar to the support structure 28 for module 20. Affixed to one or both of the support structures 28 and 48 is a kinematic connection mechanism that maintains the kinematic dynamics of the continuous web of receiver medium 60 in traveling from the module 20 into the module 40. Also affixed to one or both of the support structures 28 and 48 are one or more angular constraint structures 26 for setting an angular trajectory of the receiver medium 60.

Printing system 10 optionally includes a turnover mechanism 30 that is configured to turn the receiver medium 60 over, flipping it backside-up in order to allow printing on the reverse side as the receiver medium 60 as it travels through module 40. When printing is complete, the receiver medium 60 leaves the digital printing system 10 and travels to a media receiving unit, in this case a take-up roller 18. A roll of printed media is then formed, rewound from the printed receiver medium 60. The printing system 10 can include a number of other components, including, for example, dryers 14 and additional print heads (e.g., for different colored inks), as will be described in more detail below. Other examples of digital printing system components include web cleaners, web tension sensors, or quality control sensors.

Figure 2:
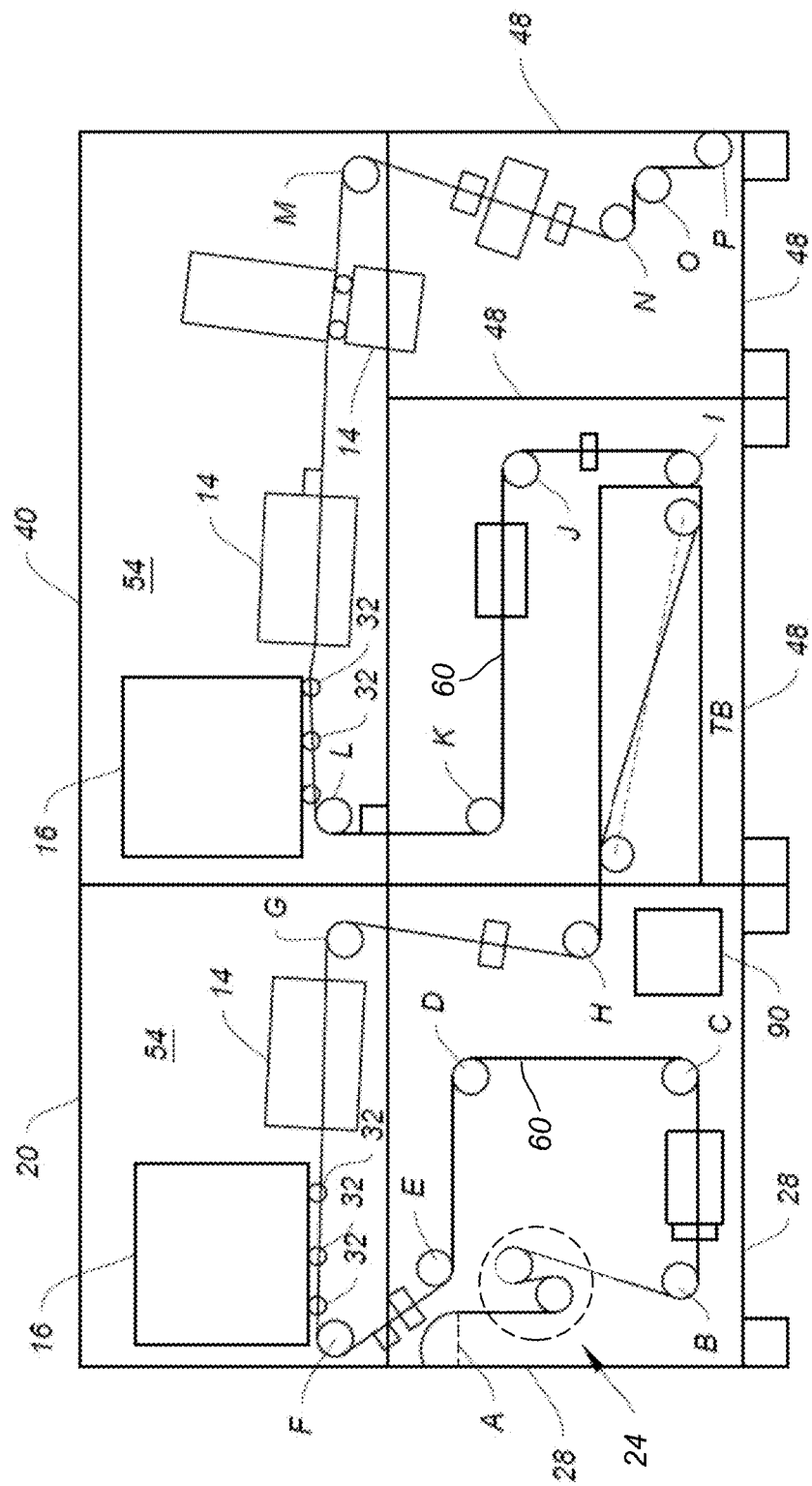
FIG. 2 is an enlarged schematic side view of media transport components of the digital printing system shown in FIG. 1.

Referring to the schematic side view of FIG. 2, an enlarged view of a portion of the printing system 10 of FIG. 1 is shown and includes the receiver medium 60 routing path through the modules 20 and 40. Within both modules 20 and 40, in a print zone 54, a printhead 16 is followed by a dryer 14. Optionally, the digital printing system 10 can also include other components within either or both of the modules 20 and 40. Examples of these types of system components include components for inspection of the print media, for example, components to monitor and control print quality.

Table 1 identifies the lettered components used for web media transport and shown in FIG. 2. An edge guide A is provided in which the receiver medium 60 is pushed laterally so that an edge of the receiver medium 60 contacts a stop. The slack web entering the edge guide A allows the receiver medium 60 to be shifted laterally without interference and without being over constrained. An S-wrap tensioning mechanism 24 provides curved surfaces over which the receiver medium 60 slides during transport. As the receiver medium 60, for example, an inkjet paper, is pulled over the curved surfaces of the tensioning mechanism 24, the friction of the receiver medium 60 across these surfaces produces tension in the receiver medium 60 feeding into roller B. As will be discussed below, in accordance with the present invention, the tensioning mechanism 24 is automatically adjusting to provide a substantially constant amount of tension of the receiver medium 60 independent of the characteristics of the receiver medium 60.

TABLE 1

Web media transport components listing for FIG. 2

| Media Handling Component | Type of Component |
|---|---|
| A | Edge guide (lateral constraint) |
| 24 | Tensioning Mechanism (zero constraint) |
| B | In-feed drive roller (angular constraint) |
| C | Castered and gimbaled roller (zero constraint) |
| D* | Gimbaled roller (angular constraint with hinge) |
| E | Edge guide (lateral constraint) OR Servo-caster with gimbaled roller (steered angular constraint with hinge) |
| F | Fixed roller (angular constraint) |
| G | Servo-caster with gimbaled roller (steered angular constraint with hinge) |
| H | Gimbaled roller (angular constraint with hinge) |
| TB | Turnover module |
| I | Castered and gimbaled roller (zero constraint) |
| J* | Gimbaled roller (angular constraint with hinge) |
| K | Edge guide (lateral constraint) OR Servo-caster with gimbaled roller (steered angular constraint with hinge) |
| L | Fixed roller (angular constraint) |
| M | Servo-caster with gimbaled roller (steered angular constraint with hinge) |
| N | Out-feed drive roller (angular constraint) |
| O | Castered and gimbaled roller (zero constraint) |
| P | Gimbaled roller (angular constraint with hinge) |

Note:
Asterisk (*) indicates locations of load cells

The first angular constraint is provided by in-feed drive roller B. This is a fixed roller that cooperates with a drive roller in the turnover section TB and with out-feed drive roller N in module 40 in order to move the receiver medium 60 through the printing system with suitable tension in the direction of movement or travel in the receiver medium 60 (generally from left to right as shown in FIG. 2). The tension provided by the preceding tensioning mechanism 24 serves to hold the paper against the in-feed drive roller B so that a nip roller is not required at the drive roller. Angular constraints at subsequent locations downstream along the web are often provided by rollers that are gimbaled so as not to impose an angular constraint on the next downstream web span.

The media transport system of the example embodiment shown in FIG. 2 includes other components. The edge guide A at the beginning of the web media path provides lateral constraint for registering the continuous receiver medium 60. However, given this lateral constraint and the following angular constraint, the lateral constraint for subsequent web spans can be fixed. In one example embodiment, a gentle additional force is applied along the cross-track direction as an aid for urging the receiver medium 60 edge against the edge guide A. This force is often referred to as a nesting force as the force helps cause the edge of the receiver medium 60 to nest alongside the edge guide A. A suitable edge guide is described in commonly-assigned U.S. Patent Application Publication 2011/0129278, published on Jun. 2, 2011, entitled "Edge guide for media transport system", by Muir et al., the disclosure of which is incorporated by reference herein in its entirety.

In one example embodiment of the present invention, cross track position of the print media is center justified as it enters the media operating zone. This is done at transport element E either by a passive centering web guide (for example, by a web guide such as is described in commonly-assigned U.S. Pat. No. 5,360,152 entitled "Web guidance mechanism for automatically centering a web during movement of the web along a curved path" by Matoushek, the disclosure of which is incorporated by reference herein in its entirety) or by an active centering web guide (for example, by a servo-caster with gimbaled roller (i.e., a steered angular constraint with hinge), as is described in commonly-assigned U.S. patent application Ser. No. 13/292,117, the disclosure of which is incorporated by reference herein in its entirety). Fixed rollers F and L precede printhead(s) 16 in the first module 20 and the second module 40, respectively, providing the desired angular constraint to the web in each print zone 54. These rollers provide a suitable location for mounting an encoder for monitoring the motion of the receiver medium 60 through the printing system 10. Under printheads 16, the receiver medium 60 is supported by fixed non-rotating supports 32, for example, brush bars. Alternatively, fixed rollers can support the paper under the printheads, if the print media has minimal wrap around the rollers. Supports 32 provide minimal constraint to the web.

Printhead 16 prints in response to supplied print data on the receiver medium 60 in the span between roller F and G, which includes the media operation zone. Water-based inks add moisture to the print media, which can cause the print media to expand, especially in the cross-track direction. The added moisture also lowers the stiffness of the print media. Dryer 14 following the printhead 16 dries the ink, typically by a directing heat and a flow of air at the print media. The dryer drives moisture out of the print media, causing the print media to shrink and its stiffness to change. These changes to the print media in the media operation zone can cause the print media to drift in the cross-track direction as it passes through the media operation zone. The width of the print media as it leaves the media operation zone can also differ from the width of the print media as it entered the media operation zone. To accommodate these effects, one example embodiment of the present invention includes a servo-caster with gimbaled roller G (i.e., a steered angular constraint with hinge) to center justify the print media as it leaves the media operation zone. Because of the relative length to width ratio of the receiver medium 60 in the segment between rollers F and G, the continuous receiver medium 60 in that segment is considered to be non-stiff, showing some degree of compliance in the cross-track direction. As a result, the additional constraint provided by the steered angular constraint can be included without over constraining that web segment.

A similar configuration is used in the second module 40. Accordingly, in one example embodiment of the present invention servo-caster with gimbaled roller M (a steered angular constraint with hinge) is included to center justify the receiver medium 60 as it leaves the media operation zone. Roller K includes either a passive web centering guide (for example, the centering guide of U.S. Pat. No. 5,360,152) or an active mechanism such as a servo-caster with gimbaled roller (a steered angular constraint with hinge) to center justify the print media as it enters the media operation zone.

The angular orientation of the receiver medium 60 in the print zone containing one or more printheads and possibly one or more dryers is controlled by a roller placed immediately before or immediately after the print zone. This is critical for ensuring registration of the images printed from multiple printheads 16. It is also critical that the web not be over constrained in the print zones 54. As a result of the transit time of the ink drops from the printhead 16 to the receiver medium 60 that can result from variations in spacing of the printhead to the receiver medium 60 from one side of the printhead to the other, it is desirable to orient the printheads 16 parallel to the receiver medium 60. To maintain the uniformity of the spacing between the printheads 16 and the receiver medium 60, constraint relieving rollers placed at one end of the print zones 54 are preferably not free to pivot in a manner that will alter the spacing between printheads 16 and the receiver medium 60. Therefore, the castered roller following the print zone should preferably not include a gimbal pivot. However, the use of non-rotating supports 32 under the receiver medium 60 in the print zone as shown in FIG. 2 can be used to eliminate this design restriction.

Figure 3:
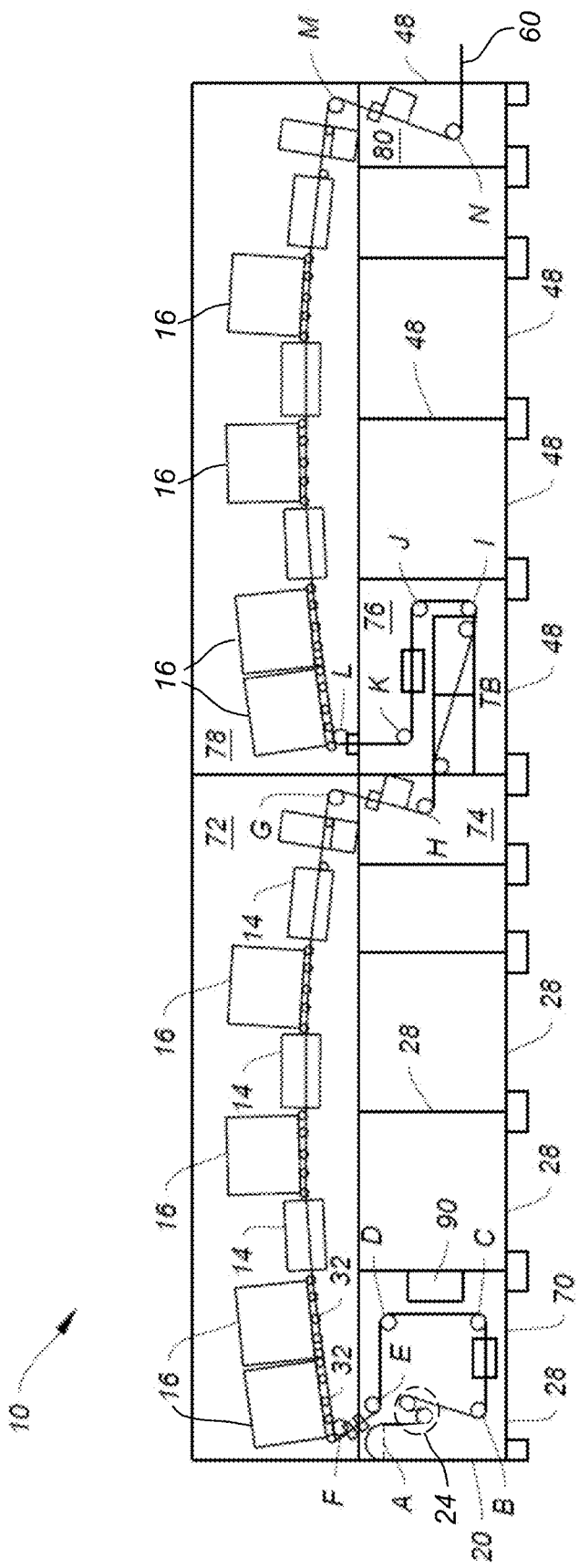
FIG. 3 is a schematic side view of a large-scale two-sided digital printing system according to another example embodiment of the present invention.

Another example embodiment of a printing system 10 shown schematically in FIG. 3 has a considerably longer print path than that shown in FIG. 2 where a plurality of printheads 16 are provided in each of a first printhead module 72 and a second printhead module 78. The plurality of printheads 16 can be used to print different ink colors (e.g., cyan, magenta, yellow and black) to enable the printing of color images. The print path shown in FIG. 3 provides the same overall sequence of angular constraints as the FIG. 2 configuration, with the same overall series of gimbaled, castered, and fixed rollers. Table 2 lists the arrangement of media transport components used with the system of FIG. 3 for one example embodiment of the invention. Non-rotating supports 32, for example, brush bars, shown between rollers F and G and between rollers L and M in FIG. 3, include non-rotating surfaces and thus apply no lateral or angular constraint forces. In accordance with the present invention, tensioning mechanism 24 automatically adjusts to reduce variability in the tension of the receiver medium 60 as well be described below.

TABLE 2

Web media transport components listing for FIG. 3

| Media Handling Component | Type of Component |
|---|---|
| A | Edge guide (lateral constraint) |
| 24 | Tensioning Mechanism (zero constraint) |
| B | In-feed drive roller (angular constraint) |
| C | Castered and gimbaled roller (zero constraint) |
| D* | Gimbaled roller (angular constraint with hinge) |
| E | Edge guide (lateral constraint) OR Servo-caster with gimbaled roller (steered angular constraint with hinge) |
| F | Fixed roller (angular constraint) |
| G | Servo-caster with gimbaled roller (steered angular constraint with hinge) |
| H | Gimbaled roller (angular constraint with hinge) |
| TB | Turnover module |
| I | Castered and gimbaled roller (zero constraint) |
| J* | Gimbaled roller (angular constraint with hinge) |
| K | Edge guide (lateral constraint) OR Servo-caster with gimbaled roller (steered angular constraint with hinge) |
| L | Fixed roller (angular constraint) |
| M | Servo-caster with gimbaled roller (steered angular constraint with hinge) |
| N | Out-feed drive roller (angular constraint) |

Note:
Asterisk (*) indicates locations of load cells

For the embodiments shown in FIG. 2 and FIG. 3, the pacing drive component of the printing system 10 is the turnover module TB. Turnover module TB is conventional and has been described in commonly-assigned U.S. Patent Application Publication 2011/0128337, entitled "Media transport system for noncontact printing", by Muir et al., the disclosure of which is incorporated by reference herein in its entirety.

Load cells are provided in order to sense web tension at one or more points in the system. In the embodiments shown in FIG. 2 (Table 1) and FIG. 3 (Table 2), load cells are provided at gimbaled rollers D and J. Control logic for the respective printing system 10 monitors load cell signals at each location and, in response, makes any needed adjustment in motor torque in order to maintain the proper level of tension throughout the system. There are two tension-setting mechanisms, one preceding and one following turnover module TB, which cooperate with the tensioning mechanism 24 to control the tension in the receiver medium 60 as it moves through the printing system 10. On the input side, load cell signals at roller D indicate tension of the web preceding turnover module TB; similarly, load cell signals at roller J indicate web tension on the output side, between turnover module TB and take-up roller 18 (not shown in FIG. 3). Control logic for the appropriate in- and out-feed driver rollers at B and N, respectively, can be provided by an external computer or processor, not shown in figures of this application. Optionally, an on-board control system 90, such as a dedicated microprocessor or other logic circuit, is provided for maintaining control of web tension within each tension-setting mechanism and for controlling other machine operation and operator interface functions. As described, the tension in a module preceding the turn bar and a module following the turnover module TB can be independently controlled relative to each other further enhancing the flexibility of the printing system. In this example embodiment, the drive motor is included in the turnover module TB. In other example embodiments, the drive motor need not be included in a turnover mechanism. Instead, the drive motor can be appropriately located along the web path so that tension within one module can be independently controlled relative to tension in another module.

The configuration shown in FIGS. 1 and 2 were described as including two modules 20 and 40 with each module providing a complete printing apparatus. However, the "modular" concept need not be restricted to apply to complete printers. Instead, the configuration of FIG. 3 can be considered as including as many as seven modules, as described below.

An entrance module 70 is the first module in sequence, following the media supply roll, as was shown earlier with reference to FIG. 1. Entrance module 70 provides the edge guide A that positions the receiver medium 60 in the cross-track direction and includes the S-wrap tensioning mechanism 24. In the embodiment of FIG. 3, entrance module 70 also provides the in-feed drive roller B that cooperates with the tensioning mechanism 24 and other downstream drive rollers to maintain suitable tension along the web of receiver medium 60 as noted earlier. Rollers C, D, and E are also part of entrance module 70 in the FIG. 3 embodiment. Transport roller E preferably includes either a passive centering web guide (for example, by a web guide such as is described in the aforementioned commonly-assigned U.S. Pat. No. 5,360,152) or a servo-caster with gimbaled roller (i.e., a steered angular constraint with hinge) in order to center justify the print media as it enters the media operation zone. The first printhead module 72 accepts the receiver medium 60 from entrance module 70, with the given edge constraint, and applies an angular constraint with fixed roller F. A series of stationary fixed non-rotating supports 32, for example, brush bars or, optionally, minimum-wrap rollers then transport the web along past a first series of printheads 16 with their supporting dryers 14 and other components. Here, because of the considerable web length in the web segment beyond the angular constraint provided by roller F (that is, the distance between rollers F and G), that segment can exhibit flexibility in the cross track direction which is an additional degree of freedom that may need be constrained. As such, in one example embodiment of the present invention roller G is a servo-caster with gimbaled roller (i.e., a steered angular constraint with hinge).

An end feed module 74 provides an angular constraint to the incoming receiver medium 60 from printhead module 72 by means of gimbaled roller H. Turnover module TB accepts the incoming receiver medium 60 from end feed module 74 and provides an angular constraint with its drive roller, as described above. Optionally, digital printing system 10 can also include other components within any of the modules described above. Examples of these types of system components include components for inspection of the print media, for example, components to monitor and control print quality.

A forward feed module 76 provides a web span corresponding to each of its gimbaled rollers J and K. These rollers again provide angular constraint only. The lateral constraint for web spans in module 76 is obtained from the edge of the incoming receiver medium 60 itself. Roller K includes either a lateral constraint (for example, an additional edge guide like the one included at roller A) or a servo-caster with gimbaled roller (i.e, a steered angular constraint with hinge) in order to maintain the cross-track position of the receiver medium 60.

A second printhead module 78 accepts the receiver medium 60 from forward feed module 76, with the given edge constraint, and applies an angular constraint with fixed roller L. A series of stationary fixed non-rotating supports 32, for example, brush bars or, optionally, minimum-wrap rollers then feed the web along past a second series of printheads 16 with their supporting dryers and other components, while providing little or no lateral constraint on the print media. In one example embodiment of the present invention, roller M is a servo-caster with gimbaled roller (i.e., a steered angular constraint with hinge) to center justify the receiver medium 60 as it leaves the media operation zone that is located between rollers L and M. Here again, because of considerable web length in the web segment (that is, extending the distance between rollers L and M), that segment can exhibit flexibility in the cross track direction which is an additional degree of freedom enabling the use of the steered angular constraint without over constraining the print media in that span.

An out-feed module 80 provides an out-feed drive roller N that serves as angular constraint for the incoming web and cooperates with other drive rollers and sensors along the web media path that maintain the desired web speed and tension. Optional rollers O and P (not shown in FIG. 3) may also be provided for directing the printed receiver medium 60 to an external accumulator or take-up roll.

Each module in this sequence provides a support structure and an input and an output interface for kinematic connection with upstream or downstream modules. With the exception of the first module in sequence, which provides the edge guide at A, each module utilizes one edge of the incoming receiver medium 60 as its "given" lateral constraint. The module then provides the needed angular constraint for the incoming receiver medium 60 in order to provide the needed exact constraint or kinematic connection of the web media transport. It can be seen from this example that a number of modules can be linked together using the apparatus and methods of the present invention. For example, an additional module could alternately be added between any other of these modules in order to provide a useful function for the printing process.

When multiple modules are used, as was described with reference to the embodiment shown in FIG. 3, it is important that the system have a master drive roller that is in control of web transport speed. Multiple drive rollers can be used and can help to provide proper tension in the web transport (x) direction, such as by applying suitable levels of torque, for example. In one embodiment, the turnover TB module drive roller acts as the master drive roller. The in-feed drive roller B in entrance module 70 (or, referring to FIG. 2, module 20) adjusts its torque according to a load sensing mechanism or load cell that senses web tension between the drive and in-feed rollers. Similarly, out-feed drive roller N can be controlled in order to maintain a desired web tension within printhead module 78 (or, referring to FIG. 2, module 40).

As noted earlier, slack loops are not required between or within the modules described with reference to FIG. 3. Slack loops can be appropriate, however, where the continuous web is initially fed from a supply roll or as it is rewound onto a take-up roll, as was described with reference to the printing system 10 shown in FIG. 1.

It is appreciated that in order to get good in-track registration between different image planes printed by different printheads 16 in a web-based printing system 10 that are considerable distance apart along the media path that a web position tracking system is required. Such a tracking system is most accurate if it provides real time information about the position of the receiver medium 60 in the close vicinity of the printheads 16 so that the timing of the printing can be adjusted to control the position of the printed image plane relative to previously printed image planes on the receiver medium 60.

The present invention will now be described with reference to FIG. 4, which shows a schematic plan view of a portion of a printing system 10 (FIG. 3) that includes a plurality of printheads 16, each including one or more nozzle arrays 86. Components such as dryers 14 (FIG. 3) are not shown in this figure for clarity. Image regions 84 were created at an upstream printing station. The requirement is to print subsequent image planes from downstream printheads 16 in registration directly on top of the pre-printed image region 84. In accordance with the present invention, a series of reference marks 82 spaced apart in the in-track direction X are applied to the receiver medium 60 by a marking heat source 81 that permanently alters a physical property of the receiver medium 60 at the locations of the reference marks 82. In the illustrated embodiment, the reference marks 82 are equally spaced in the in-track direction at a single cross-track position along one edge of the receiver medium 60. (In other embodiments, reference marks 82 can be formed at a plurality of cross-track positions across the width of the receiver medium 60.)

Mark detectors 88 at various points along the media path detect the position of the reference marks 82 as they pass under the mark detectors 88. In some embodiments, the mark detectors 88 can include imaging devices such as localized area cameras (as illustrated by the circular mark detectors 88 in FIG. 4) or full line scan cameras (as illustrated by the linear mark detector 88 in FIG. 4). Depending on the characteristics of the receiver medium 60 that are altered by the marking heat source 81, various configurations can be used by the mark detectors 88 that are adapted to sense appropriate media properties as will be described later. Accurate detection of the reference marks 82 is further enhanced through signal processing that may identify the centroids of the reference marks 82 or leading and trailing edges of reference marks 82, as well as other methods known in the art for accurately determining position from an imperfect mark of finite size.

The detection of reference marks 82 by means of mark detectors 88 in the close vicinity to printheads 16 does not in itself assure good image registration at points between the reference marks 82. Even with well-controlled media transports, the speed of the transport can vary constantly, and dimensions of the receiver medium 60 may also be changing dynamically as it travels through the printing system due to changes in moisture content of the receiver medium 60 resulting from the printing process. To account for these fluctuations, an encoder system can be used to determine the distance of medium travel along the media path. The encoder system is used to determine the in-track distance from the reference mark 82 to any point in the image region 84 to accurately register the image region 84 with the physical position of the printheads 16.

In some embodiments, the encoder system can comprise a radial encoder attached to the shaft of a roller which turns as the receiver medium rolls over its circumference. The in-track position of the receiver medium 60 can then be determined from a detected roller position. In other embodiments, the encoding system can determine the in-track position of the receiver medium 60 responsive to a motor drive control signal for a drive roller. Encoders of these types are well-known in the art.

Figure 4:
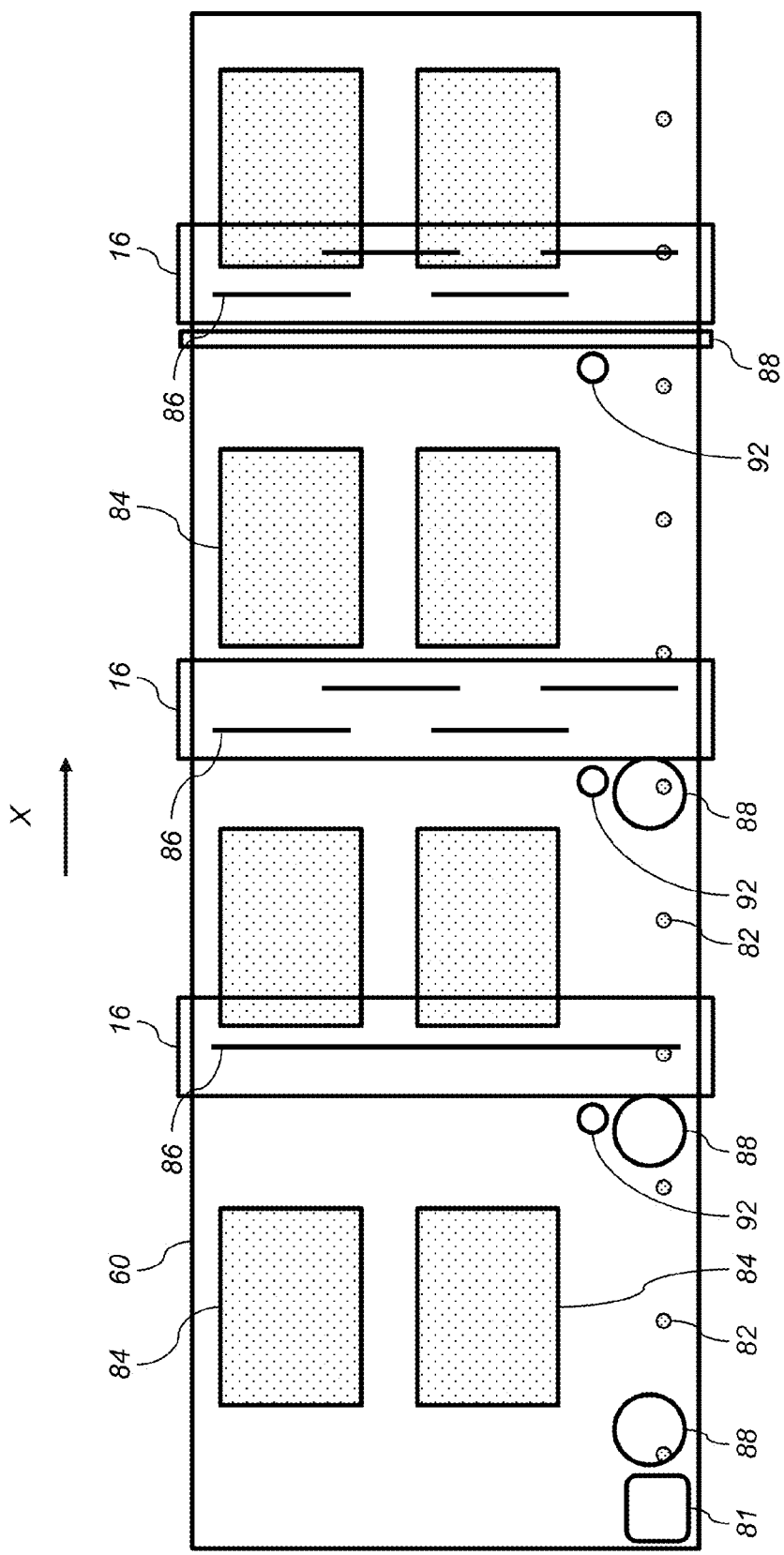
FIG. 4 is a schematic plan view of a portion of a digital printing system showing a marking heat source for forming reference marks on the receiver medium that are detectable with mark detectors.

In the embodiment illustrated in FIG. 4, the encoder system includes noncontact optical encoders 92 that detect either displacements of the receiver medium 60 or the instantaneous velocity of the receiver medium 60. An example of a noncontact optical encoder 92 is the optical motion detection system of an optical computer mouse. One means by which such optical motion detectors can work involves shining a laser on a surface, such as the surface of the receiver medium 60. A speckle pattern is created as the laser light is scattered from the surface. An image of this scattered speckle pattern is detected by an optical sensor array. As the surface moves relative to the sensor, the detected speckle pattern moves across the sensor array. By comparing the detected patterns from one image capture to the next, the distance moved by the surface relative to the sensor can be determined. An alternate measurement technique also involves shining a laser at the surface. The light scattered from the surface is frequency-shifted by a small amount due to the Doppler Effect. By detecting the amount of frequency shift, the instantaneous velocity of the surface can be determined. Integration of the instantaneous velocity with time allows the displacement of the surface to be calculated. Optical encoders 92, which don't contact the receiver medium 60, have the advantage that, unlike radial encoders, they don't have inertia to alter their response to fluctuations in the velocity of the receiver medium 60. Furthermore, while radial encoders can be susceptible to errors due to slippage of the receiver medium 60 over the roller, optical encoders 92 are immune to such errors. Radial encoders can also be susceptible to runout errors produced by eccentricity of the roller or the encoder, but optical encoders 92 are immune to this source of error.

While the signal from the optical encoder 92 can have a fine spatial resolution, it is prone to accumulate errors over long distances. Any such error is additive throughout the entire length of the receiver medium 60. Even a 0.1% error in a displacement measurement yields a 0.012 inch error in a single 12 inch long document, and the same error when used to measure out the approximately 10 foot long paper path length from the first to last printhead 16 in a typical web printing system 10 (FIG. 3) can produce an unacceptable registration error of 0.120 inch. The thermal reference marks 82 provided in accordance with the present invention serve to calibrate the optical encoder 92 to an absolute position on the receiver medium 60 at regular intervals, and thereby preventing any error from accumulating beyond the spacing between the reference marks 82. This enables the optical encoder 92 to maintain accuracy in the range of microns throughout the imaging zone of the web printing system 10.

As the receiver medium 60 passes through the printing system 10 (FIG. 3), it is necessary to register the images printed by each of the printheads 16. The present invention uses localized heat provided by marking heat source 81 to create reference marks 82 on the receiver medium 60, not by creating a detectable local thermal signature (i.e., a "hot" spot), but rather by the transmitted heat being sufficient to permanently altering a physical property of the receiver medium 60. In accordance with the present invention, a wide variety of physical properties of the receiver medium 60 can be altered, as long as the alteration is localized and permanent, and is detectable using an appropriate detection system. In some embodiments, the permanent altering of a physical property of the receiver medium 60 comprises burning a small hole through the receiver medium 60. In other embodiments, the permanent altering of a physical property of the receiver medium 60 comprises discoloring a localized area of the receiver medium 60. In other embodiments, the permanent altering of a physical property of the receiver medium 60 comprises altering a fluorescence of the receiver medium 60 in a localized area. In still other embodiments, the permanent altering of a physical property of the receiver medium 60 comprises forming a physical deformation of the receiver medium 60 in a localized area.

In some embodiments, the marking heat source 81 includes a heater (e.g., a resistive heater) that physically contacts a surface of the receiver medium 60, or is brought into close proximity to the surface of the receiver medium 60. FIGS. 5-6 illustrate an embodiment of a marking heat source 81 in which one or more heaters 98 are fabricated into a surface of a roller 94 or drum around which the receiver medium 60 is wrapped or over which the receiver medium 60 travels. The heater 98 is adapted to provide sufficient heat to the receiver medium 60 to permanently alter the physical properties of the receiver medium 60. In one embodiment, the heater 98 is a 6.2 watt BeO ceramic heater having a 500° C. maximum temperature.

Figure 5A:
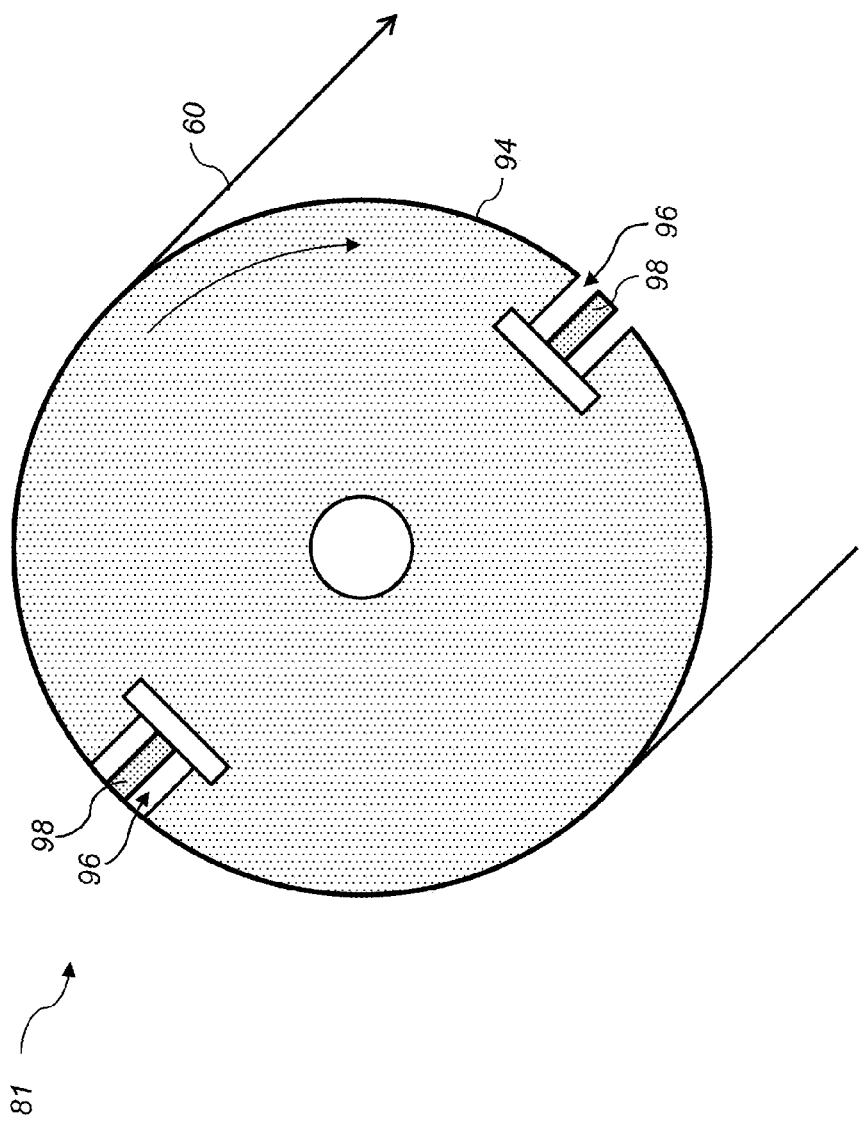
FIGS. 5A-5B illustrate the use of a resistive heater for forming reference marks on a receiver medium.
Figure 5B:
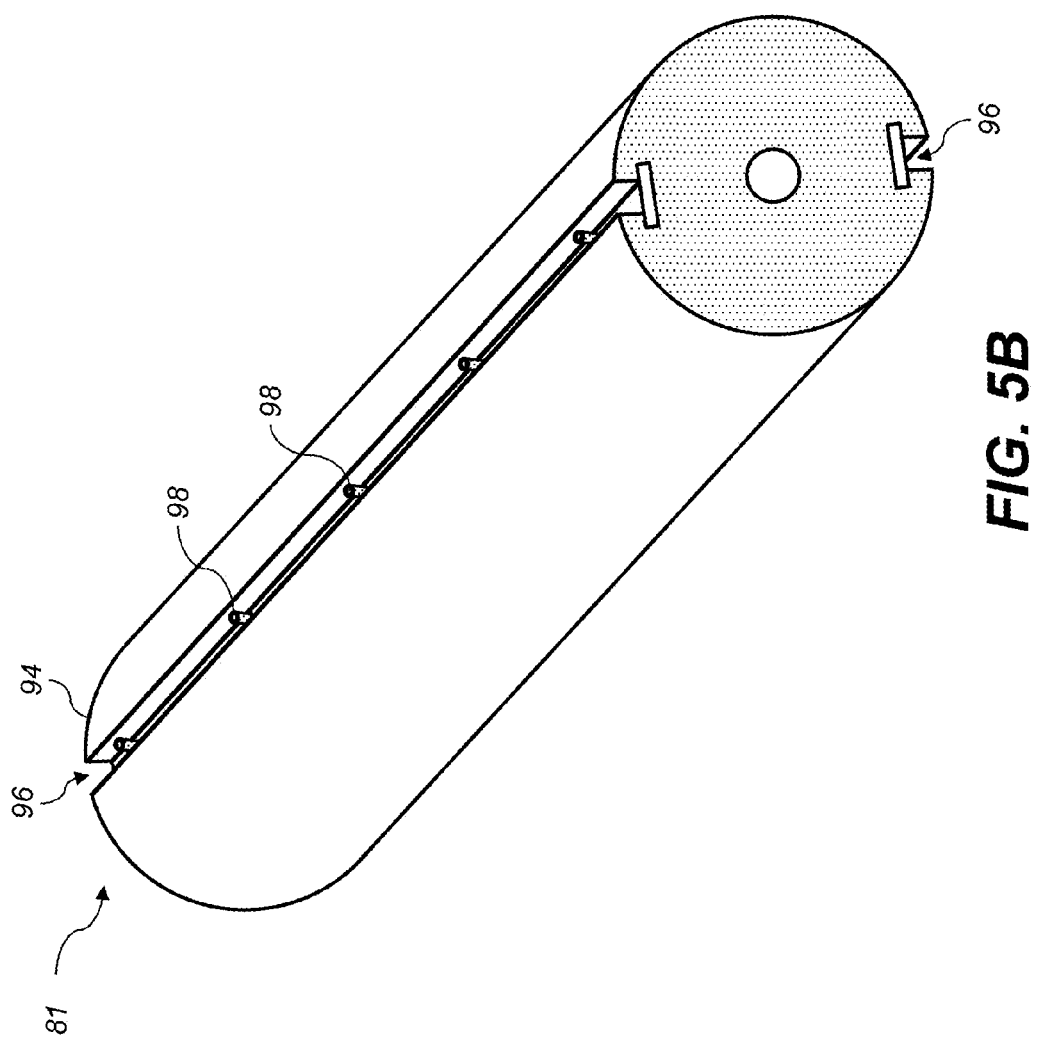

In a preferred embodiment, the heater 98 includes a thermocouple for monitoring the heater temperature, enabling the heater temperature to be regulated. In some embodiments, the heater temperature is adjusted in response to the print speed. At low print speeds, which provide longer contact time between the heater 98 and the receiver medium 60, the heater 98 is regulated to a relatively lower temperature. While at higher print speeds, having shorter contact times between the heater 98 and the receiver medium 60, higher heater temperatures are maintained. Different heater temperatures can also be used for different amount of wrap of the receiver medium around the roller 94 as different amounts of wrap around the roller 94 yield different contact times between the heater 98 and the receiver medium 60. FIG. 5A illustrates an approximately 180° wrap of the receiver medium 60 around the roller 94. In an exemplary embodiment, the roller-mounted marking heat source 81 is incorporated into the media path of the digital printing system 10 at location of roller F in FIGS. 2-3, where the wrap angle is approximately 135°.

In some embodiments, a position of the heaters 98 can be adjustable so that they can be positioned at various locations along the length of slots 96 to accommodate different widths of receiver medium 60. In some embodiments, the roller has more than one heater 98 located along the length of the roller 94. For example, five heaters 98 are shown distributed along slot 96 in FIG. 5B. This enables multiple reference marks 82 (FIG. 4) to be formed at a plurality of positions across the width of the receiver medium 60. In this case, the heaters 98 can optionally be selectively activated so that reference marks 82 can be made using a selected subset of the heaters 98 (e.g., the activated heaters 98 can be selected according to a width of the receiver medium 60).

In some embodiments, heaters 98 can be located at more than one angular position around the roller 94 to enable more than one reference mark 82 (FIG. 4) to be formed in the media advance direction for each rotation of the roller 94. In the illustrated embodiment, the heaters 98 are located in two slots 96 on opposite sides the roller 94. Accordingly, reference marks 82 will be formed on the receiver medium 60 at intervals corresponding to one half of the circumference of the roller 94. In other embodiments, a different number of slots 96 can be provided according to the size of the roller 94 and the desired mark interval.

Figure 6B:
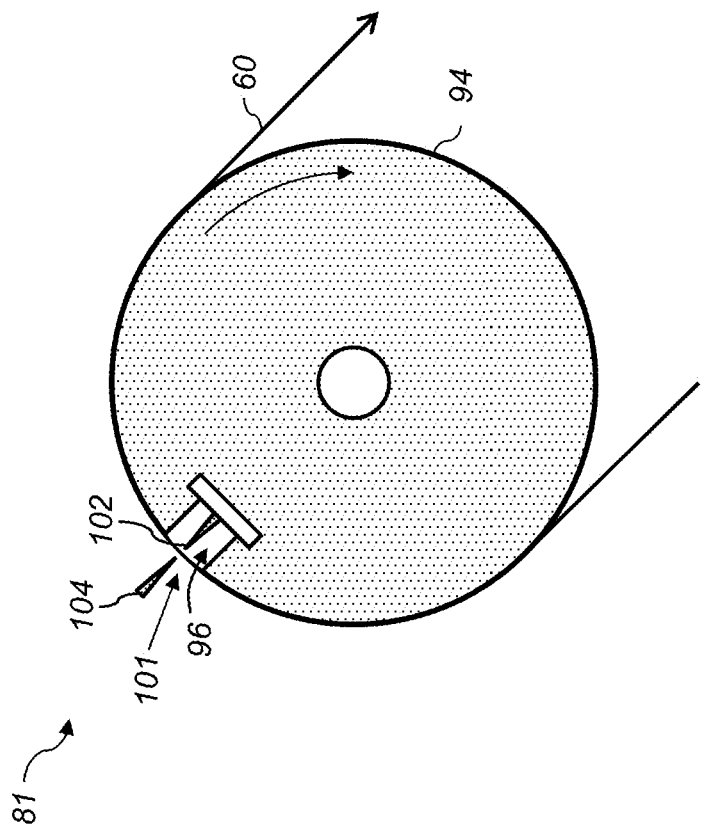
FIG. 6A-6B illustrate the use of a spark generator for forming reference marks on a receiver medium.
Figure 6A:
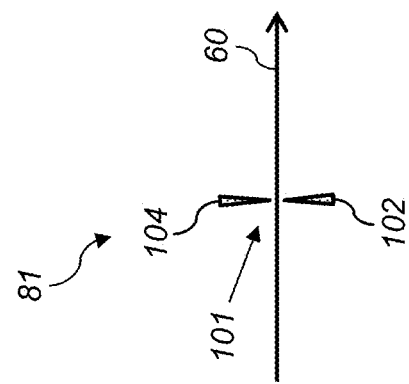

In other embodiments, the marking heat source 81 includes a spark generator 101 for producing a spark to form the reference marks 82 (FIG. 4) on the receiver medium 60 as illustrated in FIG. 6A. The spark is adapted to provide sufficient localized heat to form reference marks 82 (FIG. 4) by permanently altering a physical property of the receiver medium 60. In the illustrated embodiment, the spark generator 101 includes two pointed electrodes 102, 104, between which the receiver medium 60 passes. The two electrodes 102, 104 can be fixed, one on each side of the receiver medium 60, and a voltage sufficient to create the spark can be periodically applied between the electrodes 102, 104.

Alternatively, as shown in FIG. 6B, the spark generator 101 can include one electrode 102 attached to a roller 94 and a second electrode 104 positioned adjacent to the roller 94 in a fixed position. In the illustrated configuration, the electrode 102 is shown located in slot 96 on the surface of the roller 94. A small gap is formed between the two electrodes 102, 104 every time the roller-mounted electrode 102 is rotated past the fixed electrode 104. A voltage sufficient to create a spark is applied between the two electrodes 102, 104 each time the roller mounted-electrode 102 is rotated past the fixed electrode 104, thereby forming reference marks 82 (FIG. 4) on the receiver medium 60.

In other embodiments, the marking heat source 81 includes a laser source whose output is directed at a localized portion of the receiver medium 60. For example, a laser 99 can be fixed over a portion of the receiver medium 60 as illustrated in FIG. 7A, and can be pulsed as the receiver medium 60 passes by it. The illumination from the laser 99 is adapted to provide sufficient localized heat to form reference marks 82 (FIG. 4) by permanently altering a physical property of the receiver medium 60.

Figure 7B:
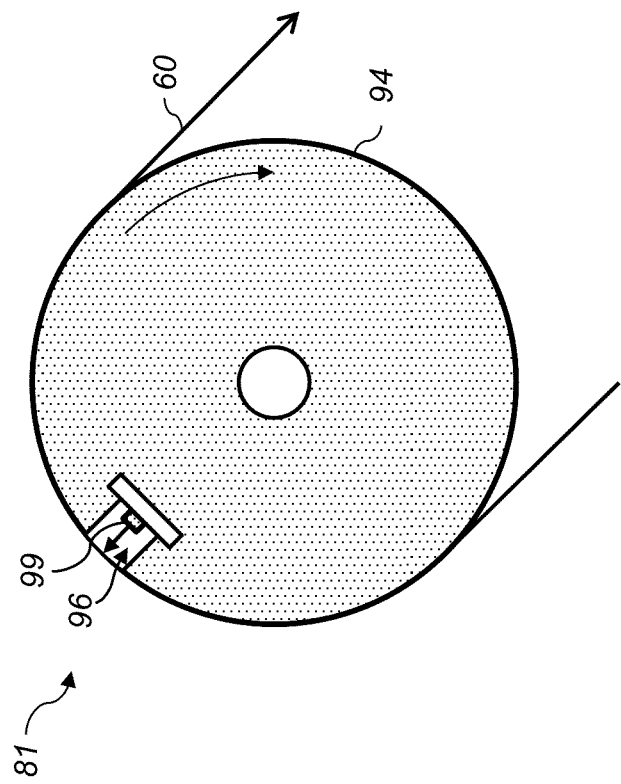
FIG. 7A-7B illustrate the use of a laser for forming reference marks on a receiver medium.
Figure 7A:
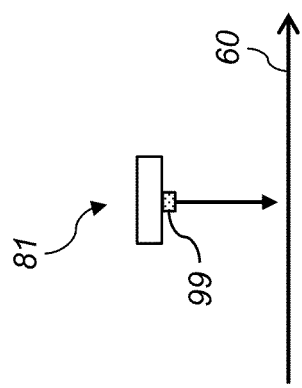

Alternatively, a laser 99 can be mounted on or in a media transport roller 94 as illustrated in FIG. 7B, in a similar manner to the roller-mounted heaters 98 shown in FIG. 5A. In this configuration, the laser 99 illuminates the receiver medium 60 as it passes around the roller 94. Illumination by means of a roller-mounted laser 99 can allow lower laser power levels to be used as the laser 99 can illuminate a single spot on the receiver medium 60 for a longer time interval when compared to the configuration of FIG. 7A where the laser 99 is mounted in a fixed position over the moving receiver medium 60. In some embodiments, optical fibers (not shown) can be used to direct the light from the laser 99 to the desired point of illumination of the receiver medium 60 for the formation of the reference marks 82.

In some embodiments, the process of providing localized heating of the receiver medium 60 to alter a physical property of the receiver medium 60 can include formation of reference marks 82 comprised of small holes through the receiver medium 60. A highly-focused, pulsed laser is a preferred type of marking heat source 81 for forming this type of reference marks 82 since they typically require more energy per reference mark 82 relative to embodiments that form other types of reference marks 82 (e.g., reference marks 82 formed by locally discoloring the receiver medium 60 or quenching the fluorescence of the receiver medium 60).

Power can be supplied to the roller-mounted heaters 98 (FIG. 5A) in the rotating roller 94 through various means. In one embodiment, power is supplied via brushes that contact slip rings on the on the roller 94. Alternately, power can be coupled to the heaters 98 by means of a rotary transformer, having a stationary primary winding attached to the printer frame and a secondary winding that rotates with the roller 94. Similar power transfer mechanisms can be used for embodiments in which the reference marks 82 are formed by roller-mounted spark generators 101 (FIG. 6B) or by roller-mounted lasers 99 (FIG. 7B).

In some embodiments, the area surrounding the marking heat source 81, can include a gas flow source (not shown), together with associated shrouds and ducts, to establish an inert atmosphere in the marking zone. The inert atmosphere reduces the risk of burning the receiver medium 60.

Figure 8:
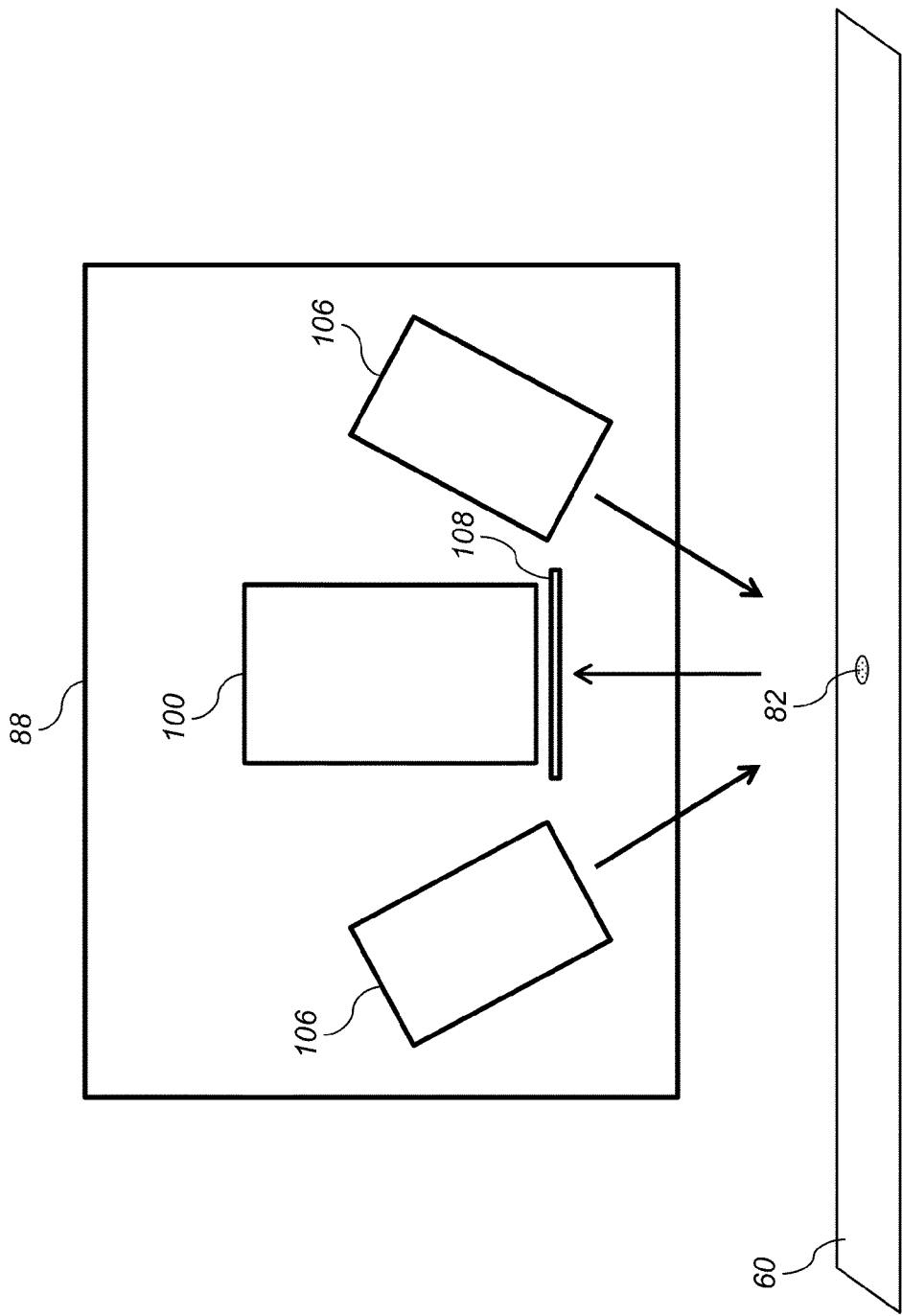
FIG. 8 illustrates an embodiment of a reference mark detector where the receiver medium is illuminated using off-axis light.

In some embodiments, the localized heating of the receiver medium 60 forms the reference marks 82 by altering the color of (i.e., discoloring) the receiver medium 60 in a localized area. FIG. 8 illustrates a configuration for a mark detector 88 that can be used to detect such reference marks. One or more light sources 106 (sometimes referred to as illumination sources) are used to illuminate the receiver medium 60, and a sensor 100 is used to detect light reflected from the receiver medium 60 and provide a sensed signal. Depending on the application, the light sources 106 can emit visible light (i.e., optical radiation having wavelengths in the range of about 400-700 nm), or alternatively can emit radiation in the infrared or ultraviolet portions of the spectra.

The sensor 100 is a light sensor sensitive to the light provided by the light source 106. The discolored reference marks 82 are detected as a change in the brightness or color of the receiver medium 60 sensed by the sensor 100. Preferably, the sensor 100 is used to capture an image of the receiver medium 60 as the receiver medium 60 passes by the mark detector 88. The sensor 100 is typically a CCD or CMOS array sensor (e.g., a 2-D area array sensor or a 1-D linear array sensor). For embodiments using a 2-D area array sensor, the sensor 100 can be used to capture 2-D images of the receiver medium 60 at regular time intervals. For embodiments using a 1-D linear array sensor, the sensor 100 can be used to capture a succession of 1-D images and a data processor can assemble the 1-D images to form a 2-D image of the receiver medium 60. In some configurations, the 1-D images can be captured at a series of times separated by a predefined time interval. Alternatively the capture of the 1-D images can be controlled directly or indirectly using a signal from an encoder that measures the displacement of the receiver medium 60, so that the 1-D images are captured at predefined spatial intervals along the receiver medium 60.

Depending on the type of receiver medium 60 and the amount of heat applied by the marking heat source 81, the discoloration can have different characteristics. For example, the discoloration can be a slight yellowing of the receiver medium 60, or can be a darker discoloration (e.g., a light brown, dark brown or black discoloration). To enhance the detection of the discoloration associated with the reference marks 82, the mark detectors 88 can capture images using an appropriate narrow wavelength band selected to provide a high contrast level of the reference mark 82 relative to the background in the captured images. This can involve the use of narrow wavelength band light sources 106 such as LEDs, laser diodes, or filtered incandescent lamps to illuminate the receiver medium 60. Alternately, a narrow wavelength band filter 108 can be provided in front of the sensor 100. Generally, the narrow wavelength band should be selected to coincide with a wavelength range where the reference marks 82 have a relatively high level of light absorption (e.g., yellowish reference marks 82 will generally have the highest level of light absorption in the blue portion of the spectra).

Figure 9:
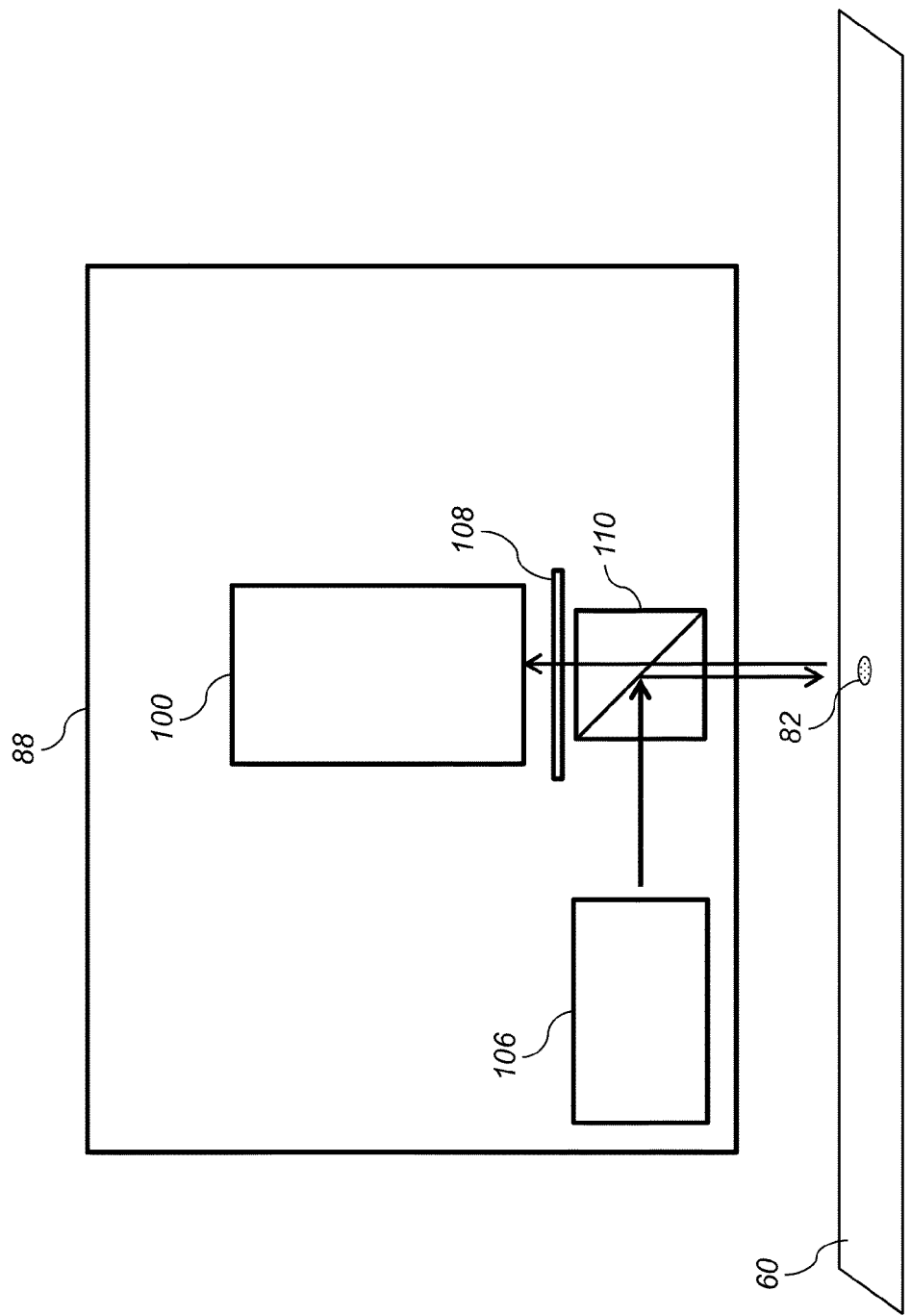
FIG. 9 illustrates an embodiment of a reference mark detector where the receiver medium is illuminated using on-axis light.

In the configuration of FIG. 8, the illumination direction of the receiver medium 60 by the light sources 106 off-axis relative to the sensor 100. Alternatively, as shown in FIG. 9, the mark detector 88 can include a beam splitter 110 located on the optical axis of the sensor 100 to provide "on-axis" illumination on the optical axis of the sensor 100. On-axis illumination tends to eliminate or reduce contrast variations produced by the texture of the receiver medium 60. However, on-axis illumination can suffer from glare of specular reflection of smooth glossy surfaces. In on-axis illumination, light from light source 106 is reflected by the beam splitter 110 toward the receiver medium 60. A portion of the light reflected, or scattered from the receiver medium 60 passes back through the beam splitter to the sensor 100. Filter 108, located in front of the sensor 100, passes the narrow wavelength band that provides high contrast for the discoloration of the receiver medium. The discolored reference marks 82 are detected as a change in the brightness detected by the sensor 100.

Figure 10:
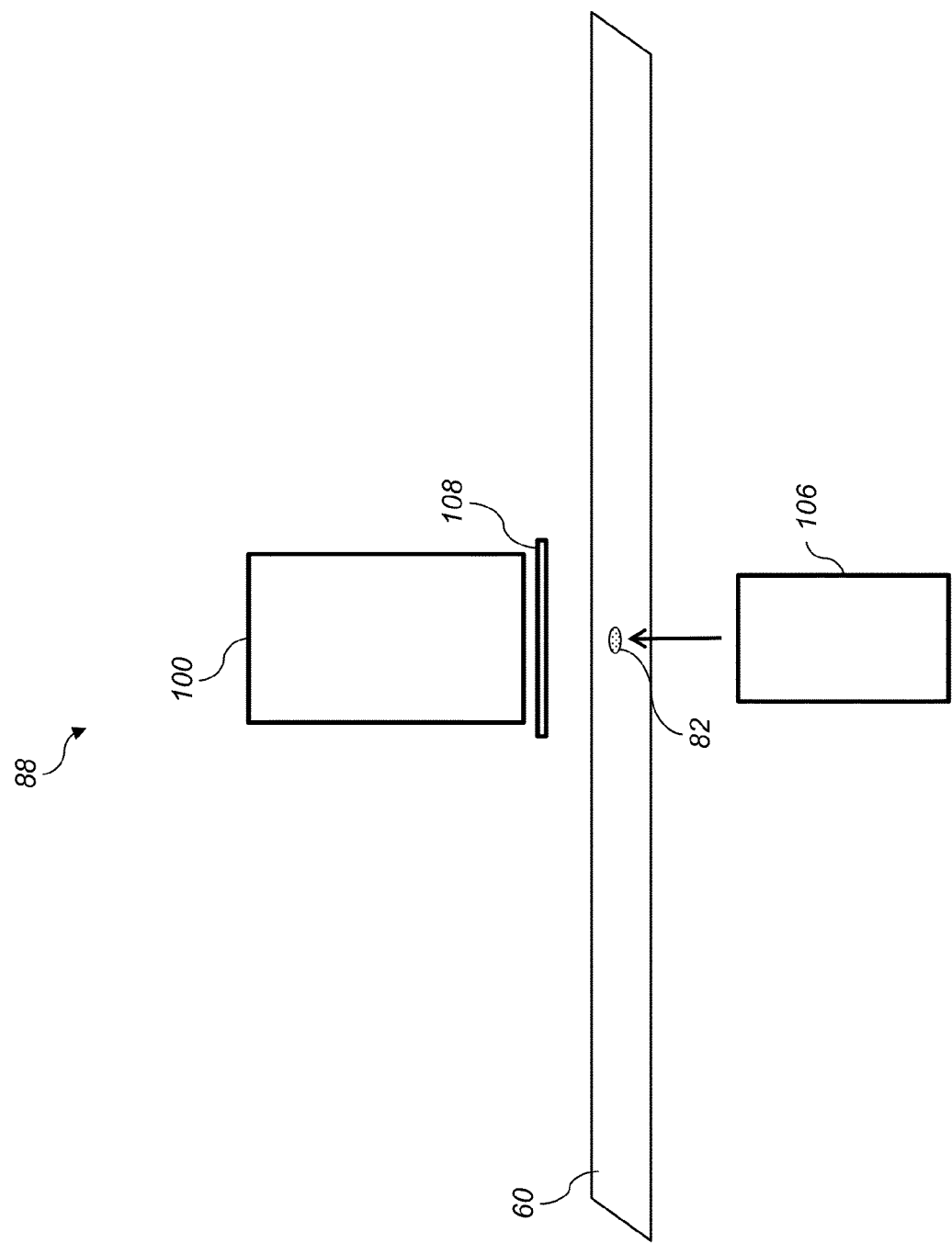
FIG. 10 illustrates an embodiment of a reference mark detector where the receiver medium is illuminated using transmitted light.

FIG. 10 illustrates an alternate embodiment of a mark detector 88 where the receiver medium 60 is illuminated using light transmitted through the receiver medium 60. This configuration is particularly appropriate for embodiments where the reference marks 82 are small holes formed through the receiver medium 60. In this case, the sensor 100 will sense a higher light level at the location of the holes than for background regions. For embodiments where the reference marks 82 are formed by discoloring the receiver medium 60, or quenching the fluorescence of the receiver medium 60, this approach is only appropriate when the receiver medium 60 has a relatively high level of transmittance or translucence so that the level of transmitted light is high enough for the sensor 100 to reliably detect.

Figure 11:
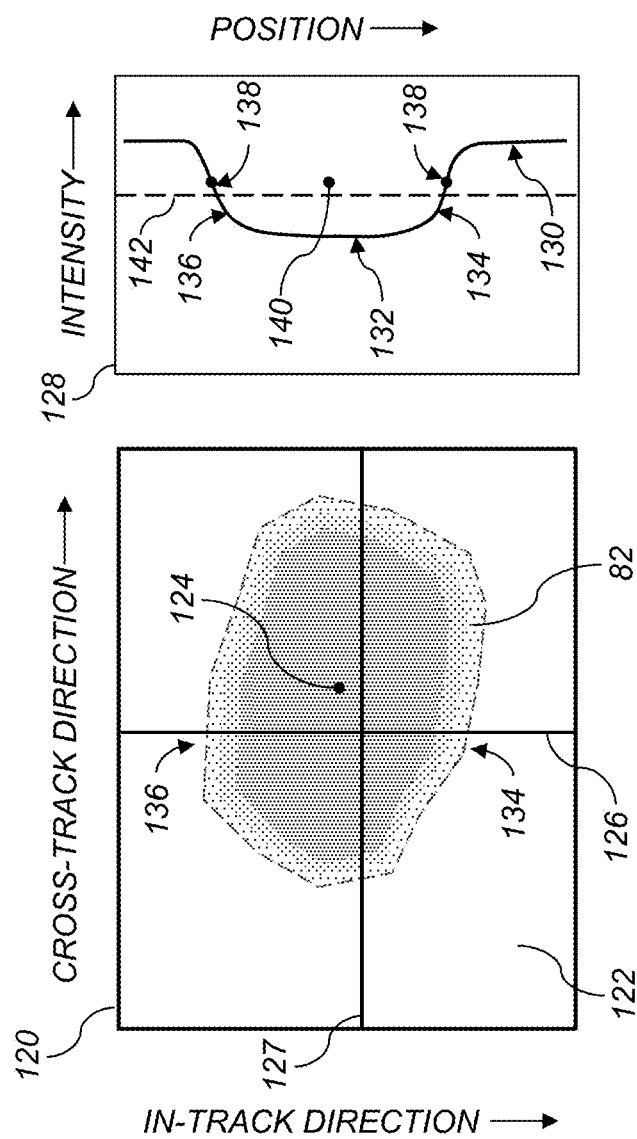
FIG. 11 illustrates the analysis of a captured image for determining the position of a reference mark.

The output of the sensor 100 can be then analyzed by a data processor to determine the position of the reference mark 82 by detecting a change in the light level (e.g., the brightness or the color) that is characteristic of the discoloration of the receiver medium 60. FIG. 11 illustrates a captured image 120 including an image of a reference mark 82. To the right of the captured image 120 is an intensity plot 128, which corresponds to the sensed intensity (i.e., a sensed light level) of pixels in pixel column 126 of the captured image 120 as a function of position. (It will be obvious to one skilled in the art that other appropriate measures of sensed light besides intensity could be used in accordance with the present invention to characterize the reference mark 82 including luminance, lightness, density, hue, and chroma.) It can be seen that the pixels corresponding to the reference mark 82 have a low intensity level 132, while pixels corresponding to background region 122 around the reference mark 82 have a high intensity level 130. (While a single intensity plot 128 corresponding to the pixels in the pixel column 126 is shown for illustration purposes, the data processing would typically involve processing intensity data for all pixel columns and or all pixel rows of the captured image 120.)

In some embodiments, the processing of the image data for the captured image 120 can include identifying the pixels in the captured image 120 having an intensity level either above or below a predefined threshold level 142. The threshold level 142 can be determined in accordance with the nature of the discoloration and the type of filter 108 used. (In some embodiments, the threshold level 142 can be determined adaptively by sensing a background intensity level associated with a background region on the receiver medium 60 and setting the threshold level 142 to be an appropriate intensity level increment below the background intensity level.) In the illustrated example, the discoloration causes the reference mark 82 on the receiver medium 60 (FIG. 8) to be darker than the non-affected background region 122 in the portion of the spectrum passing through the filter 108 (FIG. 8). With an appropriately selected threshold level 142, the image pixels in the captured image 120 corresponding to the reference mark 82 would have intensity levels below the threshold level 142 while the image pixels corresponding to regions of the receiver medium 60 not affected by the heater (i.e., background 122) will have intensity levels above the threshold level 142. Accordingly, the collection of the pixels in the captured image 120 with intensity levels below the threshold level 142 can be identified as belonging to the reference mark 82. The position of the reference mark 82 can be characterized by computing a 2-D centroid 124 of the identified pixels.

In other embodiments, the data processing of the image data for the captured image 120 can include determining a position of the reference mark 82 with respect to positions of a leading edge 136 and a trailing edge 134 of the reference mark 82. One approach to characterize the positions of the leading edge 136 and the trailing edge 134 is to identify inflection points 138 in the intensity plot 128 corresponding to the leading edge 136 and the trailing edge 134 of the reference mark 82. In this case, the position of the reference mark 82 can be characterized by the location of a midpoint 140 halfway between the inflection points 138. In some embodiments, a representative pixel column 126 is selected for analysis to determine the midpoint 140. In other embodiments, midpoints 140 can be determined for a plurality of pixel columns 126, and the average positions of the leading edge 136 and the trailing edge 134 can be determined. Alternately, the image data for a plurality of the pixel columns 126 can be combined (e.g., by summing them) to provide a single intensity plot 128 that is analyzed to determine the positions of the leading edge 136 and the trailing edge 134. This approach can be used to determine both an in-track position and a cross-track position of the reference mark 82, by analyzing pixel columns 126 and pixel rows 127, respectively, in the captured image 120.

In some embodiments, the sensor 100 includes a single point sensor, rather than a linear array sensor or an area array sensor. When such sensors are used, the output of the sensor would comprise a sequence of intensity values corresponding to a sequence of points on the receiver medium 60 as the receiver medium 60 is translated through a field of view of the sensor 100. Typically, intensity data would be acquired from the single point sensor at a series of times separated by a predefined time interval. Alternatively the acquisition of intensity values from the single point sensor can be controlled directly or indirectly from an encoder which measures the displacement of the receiver medium 60, so that the intensity values are acquired at predefined spatial intervals along the receiver medium 60. The individual intensity values can be assembled into sequence to yield an intensity plot 128 analogous to that shown in FIG. 11. The processing of the sensor data can then be carried out in a similar manner to that described with respect to FIG. 11. For example, the position of the reference mark 82 can be characterized by a 1-D centroid of the data points whose intensity values are below threshold level 142. Alternatively, the position of the reference mark 82 can be characterized by the midpoint 140 between the inflection points 138 on the leading edge 136 and the trailing edge 134 of the intensity plot.

Figure 12:
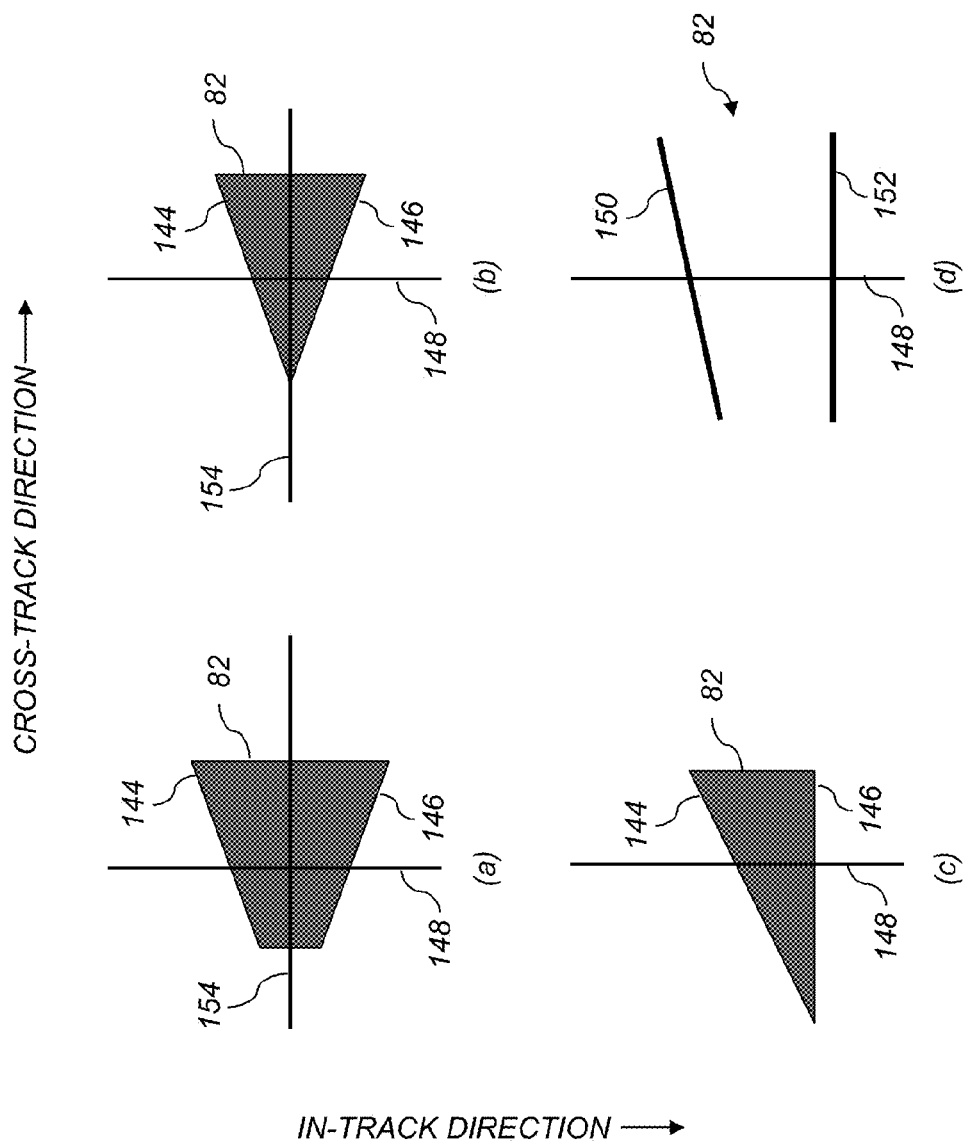
FIG. 12 illustrates several types of reference marks appropriate for use with single point sensors.

When a single point sensor is used, it is advantageous to form the reference marks 82 in a manner that allows both an in-track and a cross-track position of the reference marks 82 to be determined from the sequence of intensity values sensed by the sensor 100. FIG. 12 shows several embodiments of reference marks 82 that can be used to determine a cross-track position in addition to in-track position. These reference marks 82 are all characterized by a tapered shape in which a leading edge 144 and a trailing edge 146 are not parallel. (Some of these reference marks 82 are similar to those described in U.S. Pat. No. 3,701,464 to Crum, entitled "Circumferential and lateral web registration control system," and in commonly-assigned U.S. Pat. No. 6,682,163 to Metzler et al., entitled "Method and device for detecting and correcting chromatic aberrations in multicolor printing," which are incorporated herein by reference.) The reference marks should have sufficient length in the cross-track direction to ensure that some portion of the reference marks 82 will pass under the single point sensor given the expected levels of cross-track web wander.

As the reference marks 82 of FIG. 12 move past a single point sensor in the in-track direction (e.g., from top to bottom), the sensor acquires intensity values along a data acquisition path 148 that crosses the reference marks 82. As the leading edge 144 and the trailing edge 146 are not parallel the distance along the data acquisition path 148 between the detected leading edge 144 and trailing edge 146 depends on where the data acquisition path 148 crosses the reference mark 82 in the cross-track direction. Knowing the geometry of the reference mark 82 and the determined distance between the leading edge 144 and trailing edge 146, it is therefore possible to estimate the lateral position of the reference mark 82 relative to the position of the single point sensor.

To provide a clearly defined in-track position reference, it is preferred that leading edge 144 and the trailing edge 146 of the reference mark are symmetric to each other about a centerline 154 of the reference mark 82, such as is shown in FIG. 12(*a*) and FIG. 12(*b*). The midpoint between the detected leading edge 144 and trailing edge 146 then lies on the centerline 154 of the reference mark, independent of where the data acquisition path 148 crosses the reference mark 82 in the cross-track direction.

An alternate geometry is for either the leading edge 144 or the trailing edge 146 of the reference mark 82 to be oriented perpendicular to the in-track direction (i.e., the direction of travel of the receiver medium 60) as shown in FIG. 12(*c*). In this example, the trailing edge 146 of the reference mark 82 is perpendicular to the in-track direction, and therefore is perpendicular to the data acquisition path 148. For such geometries, the in-track position of the reference mark 82 can be defined by the detected position of the perpendicular edge of the reference mark 82. This provides a consistent in-track position determination independent of where the data acquisition path 148 crosses the reference mark 82 in the cross-track direction.

As illustrated in FIG. 12(*d*), the reference mark 82 doesn't have to be a solid "filled-in" mark. The reference mark 82 of FIG. 12(*d*) comprises a first line 150 and a second line 152 which are not parallel to each other. As with the filled in geometries of the reference marks 82 discussed with reference to FIGS. 12(*a*)-(*c*), a determination of the spacing between the detected first line 150 and the second line 152 along the data acquisition path 148 enables the cross-track position of the reference mark 82 to be determined. Again it is preferable for the first line 150 and the second line 152 to either be symmetrically placed around a centerline of the reference mark 82, or that either the first line 150 or the second line 152 be perpendicular to the in-track direction to provide a consistent determination of the in-track position of the reference mark 82 independent of where the data acquisition path 148 crosses the reference mark 82.

Reference marks 82 having shapes such as those illustrated in FIG. 12 can be made using any appropriate means. For example, the desired shapes can be formed by shaping the surface of the heater 98 (FIG. 5A) that contacts the receiver medium 60. For cases where a laser is used to form the reference marks 82, the beam profile can be shaped using any suitable means known in the art to correspond to the desired geometry of the reference mark 82. For example, the laser beam profile can be altered by passing the laser bean through an appropriately shaped mask.

Many types of receiver media 60 are papers that include optical brighteners. Optical brighteners are fluorescent dyes or pigments that emit light in the visible spectrum (typically in the blue region of the spectrum) when illuminated with light outside the visible spectrum (typically with light in the ultraviolet region). It has been determined that with sufficient localized heating of the receiver medium 60, the optical brighteners can be thermally degraded so that they are permanently altered and no longer fluoresce, or they fluoresce with a lower intensity than the regions that are not locally heated. This reduction in the intensity of fluorescence is commonly referred to as "quenching" the fluorescence. The amount of localized heating required to quench the fluorescence of optical brighteners in the receiver medium 60 is typically less than the amount of localized heating required to discolor the receiver medium 60 (e.g., by singeing or scorching the receiver medium 60). This has the advantage lower power levels are required for the marking heat source 81. Reference marks 82 created in this fashion by locally quenching the fluorescence of the receiver medium 60 will generally be less visible to a viewer than reference marks 82 formed by singeing or scorching the receiver medium 60, which is preferable for many applications.

Mark detectors such as those shown in FIGS. 8-10 can be adapted to detect reference marks 82 produced by a localized quenching of the fluorescence of the receiver medium 60. In this case, light sources 106 having an appropriate excitation spectrum are provided that are adapted to stimulate the fluorescent agent in the receiver medium 60 to fluoresce, thereby producing emitted light with a corresponding emission spectrum. The fluorescing light from the receiver medium 60 generally has wavelengths that are different from the stimulating wavelengths provided by the light sources 106. The excitation portions of the illumination spectrum are typically in the ultraviolet portion of the spectrum, but they can also lie in the violet or infrared portions of the spectrum as well. In some embodiments, the stimulating light sources 106 can include gas discharge lamps, UV emitting fluorescent lamps, UV LEDs or laser diodes, or other light source emitting light in the excitation spectrum.

The emission spectrum (i.e., the wavelengths emitted by the fluorescing agents) generally falls within the visible spectrum (i.e., having wavelengths between 400-700 nm), typically toward the short wavelength (i.e., blue) end of the visible spectrum. Preferably, the filter 108 located in front of the sensor 100 is adapted to filter out light at the stimulating wavelengths provided by the light sources 106 so that the sensor 100 primarily detects the light emitted by the fluorescing agent rather than reflected (or scattered or transmitted) light from the light source 106. Reference marks 82 formed in this manner are characterized by a dark region against a fluorescing background region and can be detected using an analogous analysis process that was described earlier with reference to the discoloration-type reference marks 82.

Depending on the type of receiver medium 60, and the amount of heat transferred to the receiver medium 60 from the marking heat source 81, the reference marks 82 may be detectable not only on the side of the receiver medium 60 that faces the marking heat source 81, but may also be detectable on the opposite side of the receiver medium 60 as well. For example the quenched fluorescence of the receiver medium 60 may be detectable not only by a mark detector 88 positioned on the side of the receiver medium 60 that contacted the marking heat source 61, but also by a mark detector 88 positioned on the opposite side of the receiver medium 60 as well.

It will be obvious to one skilled in the art that the reference marks 82 need not be applied to the side of the receiver medium 60 being printed on. When the printing system 10 (FIG. 3) prints on a single side of the receiver medium 60, it may be desirable to have the reference marks 82, and also the mark detectors 88 for detecting such reference marks 82, located on the non-print side of the receiver medium 60. This reduces the risk that reference marks 82 will be noticed by a viewer. Placement of the reference marks 82 on the non-print side of the receiver medium 60 also reduces the risk that the ink printed on the receiver medium 60 by one of the printheads 16 will cover a reference mark 82, and thereby make it invisible at downstream mark detector 88 locations. When printing on both sides of the receiver medium 60, it may be desirable to place the reference marks 82 on the side of the receiver medium 60 that is printed second so that the likelihood of over-printing a reference mark 82 can be delayed as long as possible in the printing process.

Some types of receiver media 60 are fabricated using a thermoplastic material, or include one or more layers fabricated using a thermoplastic material. In this case, locally heating the receiver medium 60 can produce a reference mark 82 corresponding to a physical deformation in the receiver medium 60. The physical deformation can sometimes be due to a combination of heating and contacting to the surface of the receiver medium 60. Depending on the configuration of the marking heat source 81 and the receiver medium 60, the physical deformation of the receiver medium 60 may result in locally altering at least one of the smoothness, the flatness, the thickness, the gloss or the internal stress of the receiver medium 60. These localized changes to the receiver medium 60 are detected by a mark detector 88 located at a second location downstream of the marking heat source 81. Generally, the mark detector 88 is adapted to sense light from a light source that is transmitted through the receiver medium 60 or reflected off the receiver medium 60. A data processor can then analyze the sensed light levels to determine a position of the reference mark 82 (and thereby to determine the position of the receiver medium 60) as the receiver medium 60 passes along the media path by detecting a change in the sensed light levels that is characteristic of the physical deformation associated with the reference mark 82.

Figure 13:
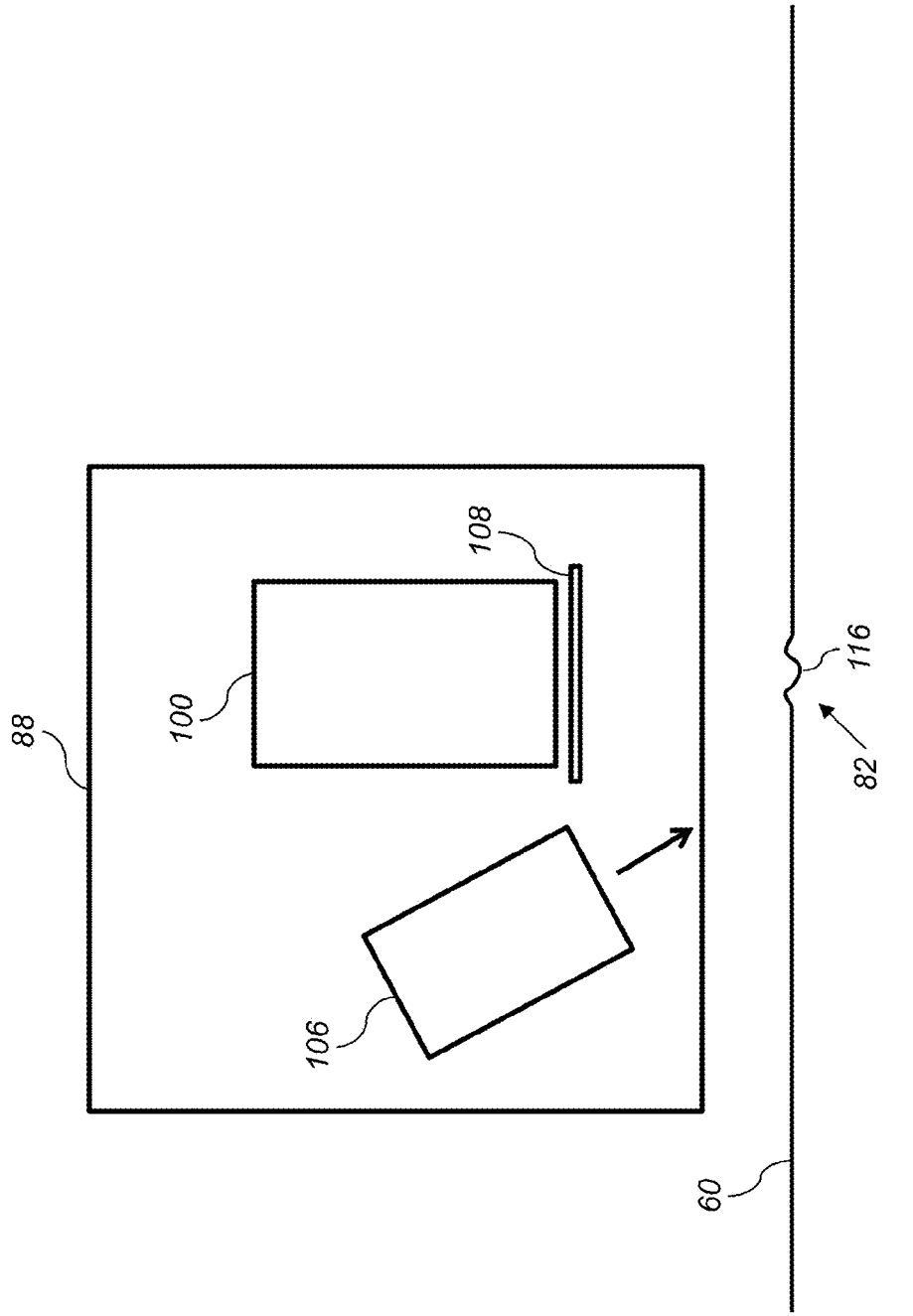
FIG. 13 illustrates an embodiment of a reference mark detector for detecting scattered light from reference marks characterized by deformations of the receiver medium.

By way of example, consider a receiver medium 60 comprising a polymeric film having a smooth specular reflecting surface. Providing localized heating of the receiver medium 60 using a marking heat source 81 can produce a reference mark 82 comprising a deformation 116 in the surface of the receiver medium 60 as illustrated in FIG. 13. The deformation 116 alters the surface of the receiver medium such that light is reflected or scattered from the surface in different directions than would be characteristic of an undeformed surface. Mark detectors 88 appropriate for detecting the deformation 116 can take a variety of different forms. In one exemplary embodiment, the mark detector 88 includes a sensor 100 and a light source 106 providing dark field illumination as illustrated in FIG. 13. With dark field illumination, the light source 106 is oriented at an oblique angle to the receiver medium 60 such that specular reflection of the light from the light source 106 off the undeformed smooth surface of the receiver medium 60 is not directed toward the sensor 100. However the deformation 116 of the surface produced by the marking heat source 81 can produce surface variations that can reflect or scatter light such that it is redirected toward and detected by the sensor 100. These surface variations are visible as bright regions against the dark field background.

In configurations where the heat provided by the marking heat source 81 induces the formation of a matte finish on the surface of the receiver medium, the whole reference mark may be visible as a bright region against the dark background. In other embodiments, the heat source may induce plastic deformation of the receiver medium 60 such that only the edges, or other features, of the reference mark 82 show up as brighter than the background region. In such configurations, the reference marks 82 may be visible only as a bright halo or ring with both the regions inside and outside the ring being dark. In either case, the resulting deformation 116 can be readily detected by the sensor 100 so that it can function as a reference mark 82. A data processor can then analyze the signals of the sensed light levels to determine the position of the reference marks 82 on the receiver medium 60 (and thereby to determine the position of the receiver medium 60) as the receiver medium 60 passes along the media path. In processing the output from the sensor 100 for embodiments in which the reference mark 82 shows up as a bright ring against the dark background, the processing can include processing the dark interior of the ring as though it has the brightness of the bright ring. The centroid of the region can then be computed. The calculated centroid of the reference mark 82 could then correspond to the interior of the ring.

Figure 14:
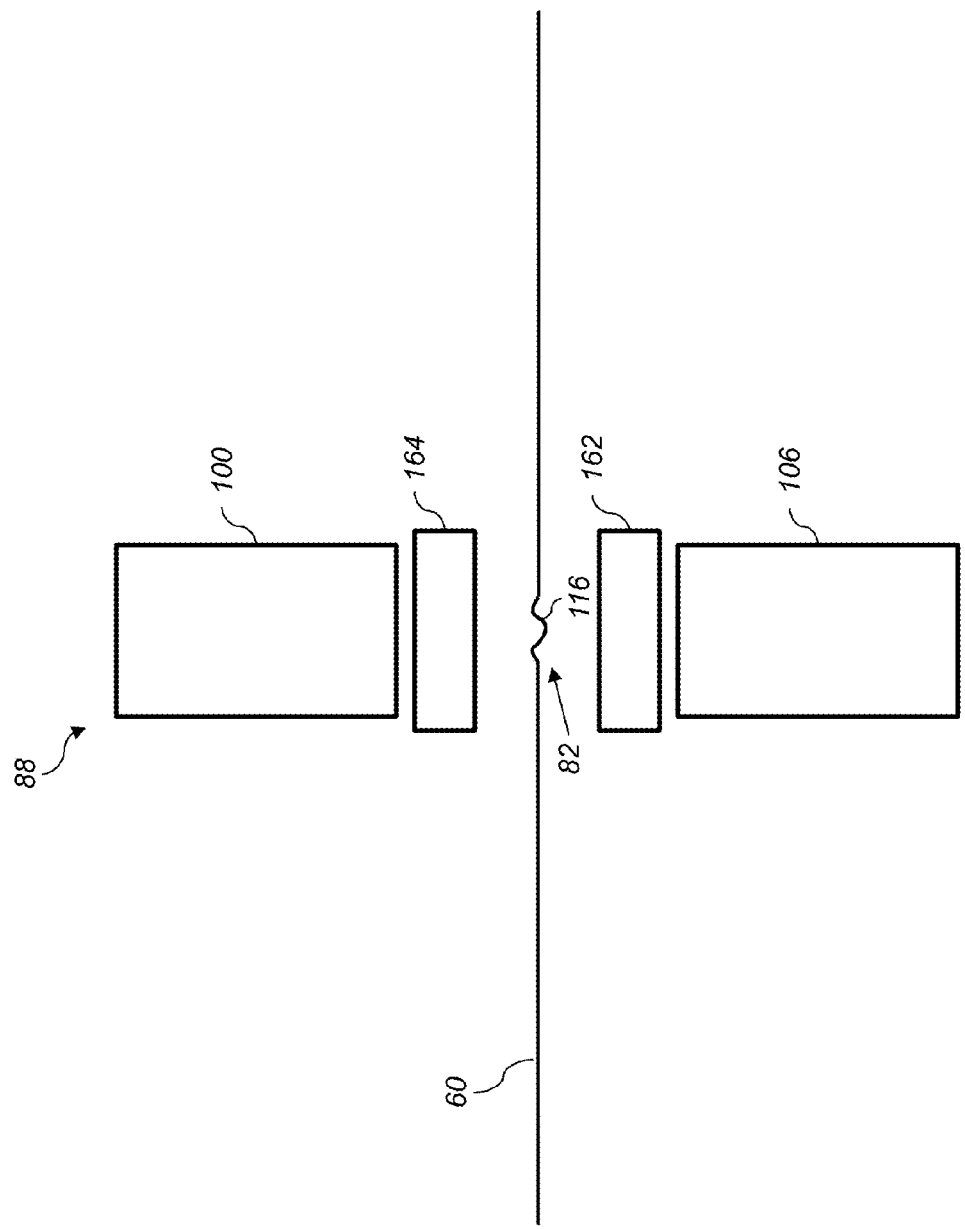
FIG. 14 illustrates an embodiment of a reference mark detector incorporating light conditioning elements for enhancing the contrast of the reference marks.

In cases where the deformation 116 corresponds to a localized change in a thickness of the receiver medium 60, the mark detector 88 can utilize various contrast enhancing techniques, such as phase contrast imaging or differential interference contrast imaging that have been developed for transmission optical microscopy, to enhance the detection of the reference mark 82. These image techniques typically involve transmission of illuminating light from a light source 106 through the receiver medium 60, with the illuminating light passing through a first light conditioning element 162 before striking the receiver medium 60 and the transmitted light passing through a second light conditioning element 164 before being sensed by the sensor 100 as shown in FIG. 14. The exact nature of the light conditioning elements 162, 164 depend in the contrast enhancement technique used. Through such techniques, changes in the thickness of the receiver medium 60 are detectable as changes in the intensity of the light passing through the receiver medium 60. The output of the sensor 100 can be analyzed by a data processor in a similar manner to that described for the previous embodiments to determine the position of the reference marks 82 on the receiver medium 60 (and thereby to determine the position of the receiver medium 60) as the receiver medium 60 passes along the media path.

Figure 15:
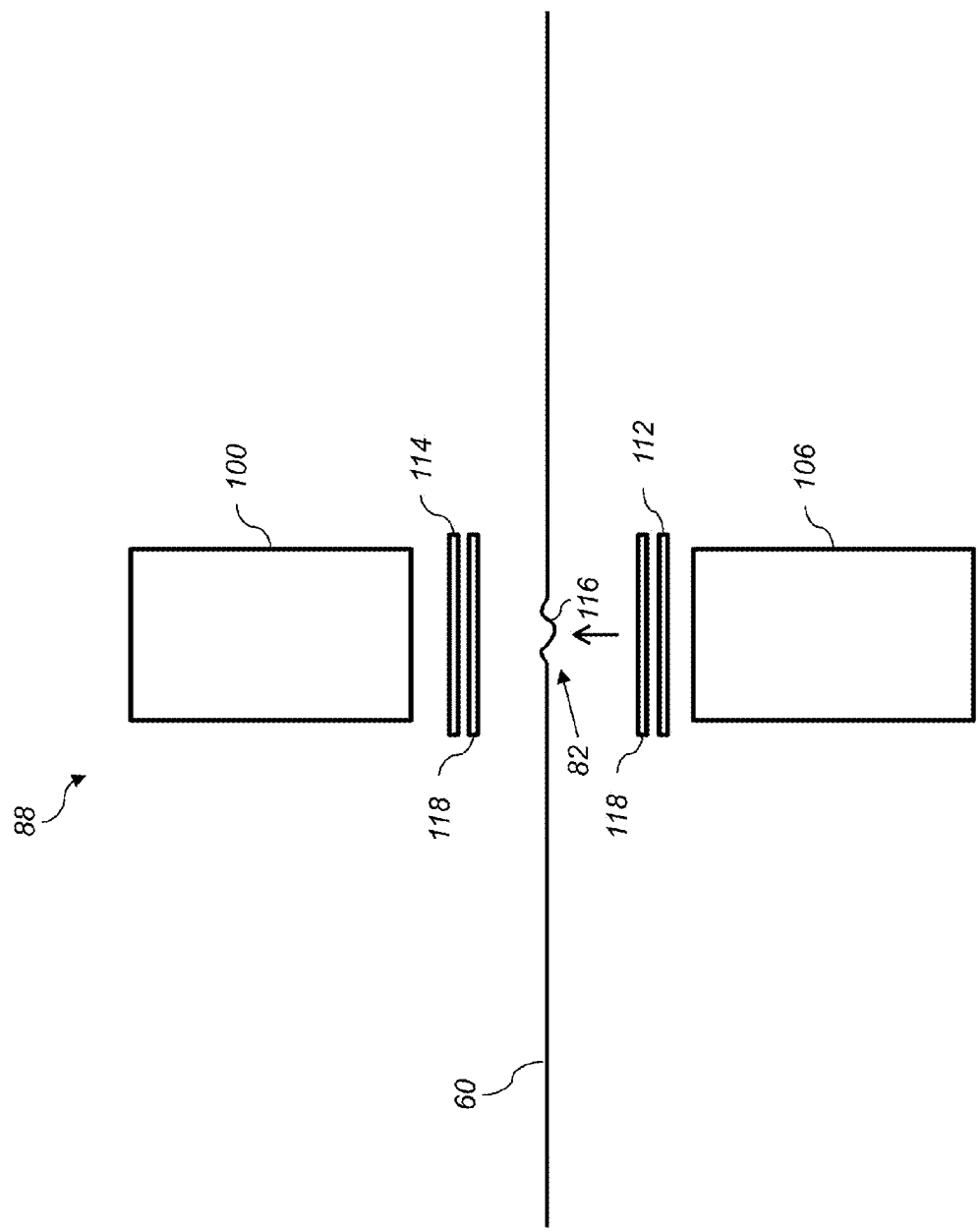
FIG. 15 illustrates an embodiment of a reference mark detector for detecting reference marks by detecting associated changes in polarization properties of the receiver medium.

Many transparent plastic materials exhibit photoelastic effects. In such materials the polarization angle of light passing through the material is altered, where the amount by which the polarization changes depends on the internal stress in the material. The thermal deformation of receiver medium 60 fabricated from such materials will alter the internal stresses in the material. To detect these changes in internal stress, mark detector 88 can be used that have the form of a polariscope as illustrated in FIG. 15. In this case, the illuminating light source 106 is located on the opposite side of the receiver medium 60 from the sensor 100. Light from the light source 106 is polarized using a polarizing filter 112 before passing through the receiver medium 60. A second polarizing filter 114 is placed between the receiver medium 60 and the sensor 100. Typically the axis of polarization of the second polarizing filter 114 is oriented at a right angle to the axis of polarization of the first polarizing filter 112. Stress variations in the polymeric material induce polarization changes in the material, which are detected by the sensor 100 as variation is intensity. In some embodiments, optical quarter-wave plates 118 are located between the polarizating filters 112, 114 and the receiver medium 60 (a configuration known as a circular polariscope) to enhance detection of the stress changes in the receiver medium 60. The output of the sensor 100 can be analyzed by a data processor in a similar manner to that described for the previous embodiments to determine the position of the reference marks 82 on the receiver medium 60 (and thereby to determine the position of the receiver medium 60) as the receiver medium 60 passes along the media path.

For cases where the deformation of the thermoplastic material locally alters the height of the surface of the receiver medium 60, mark detectors 88 can be used that are sensitive to the height of the receiver medium surface. Examples of such mark detectors 88 would include well-known laser triangulation systems and confocal imaging systems.

Once the positions of the reference marks 82 are determined by the analysis of the sensor output, the control system 90 of the digital printing system 10 can adjust the placement of the subsequently printed image planes to align them to relative to the detected position of the reference marks 82. The adjustments can include shifting a subsequently printed image plane in one or both of the in-track direction and the cross-track directions. In some embodiments, the control system 90 can control a servo-system to adjust a cross-track position of the receiver medium 60 responsive to sensing that the in-track position of the receiver medium 60 has drifted from its nominal position.

In the embodiment illustrated in FIG. 4, mark detectors 88 are positioned immediately upstream of each printhead 16, each mark detector 88 being associated with a corresponding printhead 16. If the reference marks 82 detected by the mark detector 88 associated with one of the printheads 16 are shifted in the cross-track direction from their anticipated position, the control system can shift the image data for the associated printhead 16 in the cross-track direction by a corresponding amount so that the printed image plane is properly positioned relative to the reference mark. In a similar manner, detection of an in-track shift of a reference mark 82 by a mark detector 88 associated with one of the printheads 16 can be compensated for by a corresponding in-track shift of the image data printed by the associated printhead 16. Alternately, the timing at which the image data is printed by the printhead 16 can be adjusted to control the in-track position of the printed image. Using this approach, the registration between the image planes printed by different printheads 16 can be maintained.

In some embodiments, the printing system 10 also includes appropriate finishing equipment (e.g., cutting, slitting, creasing, and folding devices) which receive the printed receiver medium 60 and perform a desired operation on the receiver medium 60. The operations that such finishing equipment performs on the receiver medium 60 are preferably aligned relative to the printed images in the receiver medium 60. Mark detectors 88 can be positioned in proximity to the finishing equipment (e.g., immediately upstream of the finishing equipment) so that the control system can control the finishing equipment in response to a detected position of the reference marks 82 in order to align the one or more finishing operations with the printed content on the receiver medium 60. For example, the control system might adjust the in-track position of cut lines based on the detected reference marks 82 on the receiver medium 60. In some embodiments, rather than controlling the finishing equipment responsive to signals from a mark detector 88 positioned adjacent to the finishing equipment, the control system can make such finishing equipment adjustments based on a mark detector 88 upstream of one of the printheads 16, typically of the most downstream printhead 16.

The variable moistening of the receiver medium 60 through the printing process can produce distortions in the receiver medium 60. Such distortions can be detected by creating regularly spaced reference marks 82 on the receiver medium 60 at predefined spacings, and subsequently detecting variations in the spacing between the reference marks 82. Once such distortions are identified, image compensation can be applied to the image data to be printed. In some embodiments, the marking heat source 81 includes a plurality of heaters 98 having a defined spacing along the length of a roller 94, and at regular angular increments around the roller 94 as was described relative to FIG. 5B. The result is to produce a regular grid of reference marks 82 on the receiver medium 60. By forming the regular grid of reference marks 82 on the receiver medium 60 prior to printing with any printhead 16, and then detecting changes in the relative positions of the grid of reference marks 82 at various locations along the media path, any distortions in the receiver medium 60 or drift in the position of receiver medium (e.g., lateral shifts or skew) can be identified. This enables the subsequently printed image planes to be modified to compensate for any distortion or shifts of the receiver medium 60 to ensure proper image plane registration throughout the printed image in spite of the distortions of the receiver medium 60. The compensations can include magnification changes and shifts of the image data in the in-track or cross-track directions, as well as skew corrections.

Figure 16:
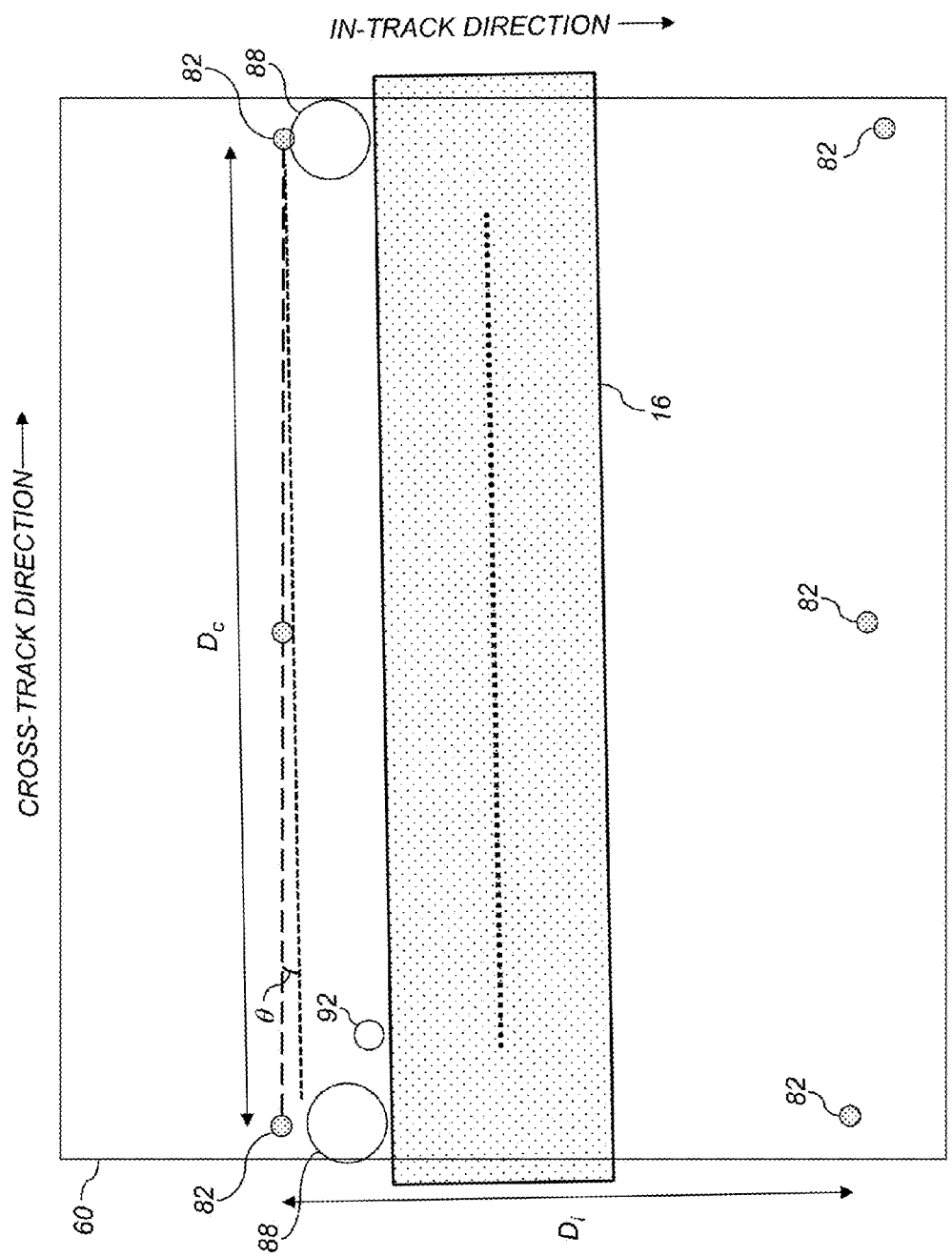
FIG. 16 shows a receiver medium marked with a grid of reference marks.

FIG. 16 shows a receiver medium 60 having a regular pattern of reference marks 82, including reference marks formed along the left and right edges of the receiver medium 60. Through analysis of the signals provided by the mark detectors 88, the control system 90 can determine shifts in a cross-track mark spacing ($D_c$) between the detected reference marks 82 along the left and right edges of the receiver medium 60. Such changes in the cross-track mark spacing of the detected reference marks 82 can occur due to shrinkage or expansion of the receiver medium 60 in the cross-track direction. The control system 90 can then adjust the magnification of the image data to be printed by the printhead 16 in the cross-track direction responsive to the determined cross-track mark spacing changes between the reference marks 82 to compensate for the cross-track shrinkage or expansion of the receiver medium 60. In some embodiments, the cross-track magnification changes can be carried out using the methods described in commonly assigned, co-pending U.S. patent application Ser. No. 13/599,067, entitled: "Aligning print data using matching pixel patterns", by Enge et al.; and to commonly assigned, co-pending U.S. patent application Ser. No. 13/599,129, entitled: "Modifying image data using matching pixel patterns", by Enge et al., each of which is incorporated herein by reference. In cases where more than two reference marks 82 are formed across the width of the receiver medium 60, localized cross-track distortions of the receiver medium 60 can be determined, and different compensations can be applied to different portions of the image data as appropriate. For example, if the printed image contains more printed image content on one portion of the receiver medium 60, that portion of the receiver medium 60 may expand to a greater extent than the other portions. To compensate for this non-uniform expansion, different magnification factors can be applied to the image data to be printed on the different portions of the receiver medium 60.

Similarly, through analysis of the signals provided by the mark detectors 88, the control system 90 can also determine shifts in an in-track mark spacing ($D_t$) between the detected reference marks 82 at a particular cross-track position. Such changes in the in-track mark spacing of the detected reference marks 82 can occur due to shrinkage or expansion of the receiver medium 60 in the in-track direction. The control system 90 can then adjust the magnification of the image data to be printed by the printhead 16 in the in-track direction responsive to the determined in-track mark spacing changes between the reference marks 82 to compensate for the in-track shrinkage or expansion of the receiver medium 60. In cases where a plurality of reference marks 82 are formed across the width of the receiver medium 60, localized in-track distortions of the receiver medium 60 can be determined and different compensations can be applied to different portions of the image data as appropriate.

Preferably, heaters 98 are positioned along a line perpendicular to the direction of travel of the receiver medium 60 (i.e., the in-track direction) so that the reference marks 82 formed by these heaters 98 are formed near the two edges of the receiver medium 60 along a line substantially perpendicular to the edges of the receiver medium 60. Using the output signals from mark detectors 88, the relative positions of the reference marks 82 along both edges of the receiver medium 60 can be determined by the control system. In this manner, the control system can determine the amount of skew of the receiver medium 60 as it passes the mark detectors 88 and the printhead 16. By comparing the times that the reference marks 82 on the left and right edges of the receiver medium 60 pass by the corresponding mark detectors 88, a skew angle θ of the receiver medium 60 can be determined. The control system 90 (FIG. 3) can then introduce a compensating skewing of the image data to be printed by the printhead 16, such that the image planes of the resulting printed image regions 84 (FIG. 4) don't show a skew relative to each other or to the receiver medium 60.

In some embodiments, the detected reference marks 82 can be used to determine a velocity that the receiver medium 60 is moving along the media path. For example, a sequence of reference marks 82 can be formed on the receiver medium 60 at regular intervals (e.g., ¼ inch) and the time intervals between when the reference marks 82 pass by a mark detector 88 can be used to determine the media velocity. In this case, the media velocity V can be computed by:

$$V = \Delta x_m / \Delta t_m = \Delta x_m f_m \qquad (1)$$

where $\Delta x_m$ is the distance between two reference marks 82 and $\Delta t_m$ is the time interval between when the two reference marks 82 pass a particular mark detector 88. The velocity can also be expressed in terms of the frequency ($f_m = 1/\Delta t_m$) that the reference marks 82 pass the mark detector 88. This approach is most appropriate for types of receiver medium 60 that are relatively rigid and are not prone to significant shrinkage and expansion.

Another method that can be used to determine the media velocity using the reference marks 82 is to determine the time interval between when a particular reference mark 82 passes two mark detectors 88 that are a known distance apart. In this case, the media velocity V can be computed by:

$$V = \Delta x_d / \Delta t_d \qquad (2)$$

where $\Delta x_d$ is the distance between two mark detectors 88 and $\Delta t_d$ is the time interval between when the reference marks 82 passed the two mark detectors 88. This approach can be used even for types of receiver medium 60 that are prone to shrinkage and expansion. Preferably, the two mark detectors 88 should be located a relatively short distance apart along the media path.

In some embodiments, the printing system 10 includes a mark detector 88 immediately downstream of the marking heat source 81 (see FIG. 4). This mark detector 88 can be used to verify that the contrast of the reference marks relative to the background. If the contrast is too low, the power to the marking heat source 81 can be increased to produce an acceptable contrast level on subsequent reference marks 82. If the contrast exceeds a certain level, power to the marking heat source 81 can be decreased to lower the visibility of the reference marks 82, and to maintain the life of the marking heat source 81.

In a preferred embodiment, the reference marks 82 are detected upstream of typically each printhead 16. This allows registration corrections to be made to the image data being printed by the printhead 16 prior to it being printed. This enables the printing system 10 to correct for more rapidly fluctuating registrations shifts, caused by web wander, and paper stretch and shrinkage. The printing system 10 can also include one or more cameras or sensors located downstream of all the printheads. Such cameras or sensor can be used to confirm that the registration is correct. These cameras or sensors can also be used to check for print defects and possibly color balance.

While the above-described embodiments have been described with respect to a web-fed printing system 10 adapted to print on a continuous web of receiver medium 60, it will be obvious to one skilled in the art that the same principles could also be applied to sheet-fed printing systems. In this case, one or more reference marks 82 can be formed on each sheet of receiver medium 60 to enable the position of the sheet to be accurately determined at various points along the media path. Preferably, a plurality of reference marks 82 can be provided (e.g., at the corners of the sheet of receiver medium 60) to enable the characterization of attributes including shrinkage, expansion and skew. Furthermore, the fundamental aspects of the present invention can also be used to track media through other types of media handling systems besides printing systems. An example of such a system would be a media-coating system used to apply one or more layers of coating to a web of media.

The invention has been described in detail with particular reference to certain preferred embodiments thereof, but it will be understood that variations and modifications can be effected within the spirit and scope of the invention.

PARTS LIST

10 printing system
12 source roller
14 dryer
16 printhead
18 take-up roll
20 module
22 cross-track positioning mechanism
24 tensioning mechanism
26 constraint structure
28 support structure
30 turnover mechanism
32 supports
40 module
48 support structure
52 slack loop
54 print zone
60 receiver medium
70 entrance module
72 printhead module
74 end feed module
76 forward feed module
78 printhead module
80 out-feed module
81 marking heat source
82 reference mark
84 image region
86 nozzle array
88 mark detector
90 control system
92 optical encoder
94 roller
96 slot
98 heater
99 laser
100 sensor
101 spark generator
102 electrode
104 electrode
106 light source
108 filter
110 beam splitter
112 polarizing filter
114 polarizing filter
116 deformation
118 quarter-wave plate
120 captured image
122 background region
124 centroid
126 pixel column
127 pixel row
128 intensity plot
130 high intensity level
132 low intensity level
134 trailing edge
136 leading edge
138 inflection point
140 midpoint
142 threshold level
144 leading edge
146 trailing edge
148 data acquisition path
150 first line
152 second line
154 centerline
162 light conditioning element
164 light conditioning element
A edge guide
B, C, D, E, F, G, H, I, J, K, L, M, N, O, P rollers
$D_c$ cross-track mark spacing
$D_i$ in-track mark spacing
TB turnover module
X in-track direction

The invention claimed is:

1. A system for tracking a position of a receiver medium as it travels along a media path, comprising:
a heat source located at a first position along the media path adapted to provide heat to the receiver medium in a localized area, the receiver medium being formed from a thermally deformable material, the provided heat being sufficient to permanently deform the localized area of the receiver medium to form a reference mark characterized by a physical deformation of the localized area of the receiver medium;
a light source that illuminates the receiver medium when it has traveled to a second position along the media path;
a sensor adapted to sense light from the light source that is transmitted through the receiver medium or reflected from the receiver medium thereby providing a sensed light level signal; and
a data processor adapted to analyze the sensed light level signal to determine a position of the receiver medium as the receiver medium passes through the second position along the media path by detecting a change in the sensed light level signal that is characteristic of the physical deformation of the localized area of the receiver medium associated with the reference mark.

2. The system of claim 1 wherein the physical deformation of the localized area of the receiver medium causes specular reflections from the surface of the receiver medium to be directed in different directions than would be characteristic of an undeformed receiver medium, and wherein the sensor is adapted to detect the reference mark by sensing a change in the specular reflections from the surface of the receiver medium.

3. The system of claim 1 wherein the physical deformation of the localized area of the receiver medium causes an amount of scattered light to be different than an amount that would be characteristic of an undeformed receiver medium, and wherein the sensor is adapted to detect the reference mark by sensing a change in the amount of scattered light.

4. The system of claim 1 wherein the receiver medium is a photoelastic material in which the polarization state of light transmitted through or reflected from the photoelastic material changes depending on the internal stress in the photoelastic material, wherein the physical deformation of the localized area of the receiver medium alters the internal stresses in the localized area of the material thereby altering the polarization state of light transmitted through or reflected from the localized area of the material, and wherein the sensor is adapted to detect the reference mark by sensing a change in the polarization state of light transmitted through or reflected from the receiver medium, the change in polarization state being produced by the altered internal stresses in the localized area of the material.

5. The system of claim 1 wherein the heat source provides heat to the localized area of the receiver medium by bringing a resistive heater into contact with a surface of the localized area of the receiver medium.

6. The system of claim 5 wherein the media path includes a rotating roller around which the receiver medium is wrapped or over which the receiver medium travels, and wherein the resistive heater is incorporated into a surface of the rotating roller, and rotates together with the rotating roller.

7. The system of claim 1 wherein the heat source provides heat to the receiver medium by illuminating it with a laser beam.

8. The system of claim 1 wherein the receiver medium moves along the media path in an in-track direction, and wherein the detected position of the reference mark is used to determine an in-track position of the receiver medium or a cross-track position of the receiver medium, the in-track position being a position in the in-track direction, and the cross-track position being a position in a cross-track direction that is perpendicular to the in-track direction.

9. The system of claim 1 wherein the heat source is used to form a plurality of reference marks at different predefined positions on the reference medium.

10. The system of claim 9 wherein the detected positions of the plurality of reference marks are used to determine an amount of skew of the reference medium, or a change in a size of the reference medium.

11. The system of claim 9 wherein the receiver medium moves along the media path in an in-track direction, and wherein at least two of the reference marks are formed at different cross-track positions on the reference medium, the cross-track positions being positions in a cross-track direction that is perpendicular to the in-track direction, the different cross-track positions being separated by predefined spacings.

12. The system of claim 9 wherein the receiver medium moves along the media path in an in-track direction, and wherein at least some of the reference marks are spaced apart at different in-track positions on the reference medium, the different in-track positions being separated by predefined spacings.

13. The system of claim 12 further including an encoding system that is used to determine a distance that the receiver medium has moved along the media path, and wherein the encoding system is used to determine the in-track position of the receiver medium intermediate to the detection of the reference marks.

14. The system of claim 13 wherein the encoding system determines the distance that the receiver medium has moved along the media path responsive to a detected roller position, a motor drive control signal, or a signal from an optical motion detection system.

15. The system of claim 1 wherein the receiver medium is a continuous web of receiver medium or the receiver medium is an individual sheet of receiver medium.

16. The system of claim 1 wherein the position of the reference mark is determined by computing a centroid of the sensed signal as a function of position.

17. The system of claim 1 wherein the position of the reference mark is determined by detecting a leading edge and a trailing edge of the reference mark and determining a midpoint between the leading edge and the trailing edge.

18. The system of claim 1 further including one or more additional sensors located at one or more additional positions along the media path adapted to sense the reference mark as the receiver medium passes through the one or more additional positions along the media path.

19. The system of claim 1 further including:
 a printing system adapted to print image data onto the receiver medium; and
 a control system that controls the printing system responsive to the detected position of the receiver medium in order to properly align the printed image data with the receiver medium.

20. The system of claim 1 further including:
 a finishing system adapted to perform one or more media finishing operations on the receiver medium; and
 a control system that controls the finishing system responsive to the detected position of the receiver medium in order to properly align the one or more media finishing operations with the receiver medium.

21. The system of claim 1 wherein the sensor is a one-dimensional image sensor that forms a two-dimensional image of a portion of the receiver medium including the reference mark by capturing one-dimensional images at a series of times separated by predefined time intervals as the receiver medium is moved past the sensor.

22. The system of claim 1 wherein the sensor is a two-dimensional image sensor that captures a two-dimensional image of a portion of the receiver medium including the reference mark.

23. The system of claim 1 further including an encoding system that is used to determine a velocity of the receiver medium as it moves along the media path.

* * * * *